（12）United States Patent
Litman et al.

(10) Patent No.: US 11,080,656 B2
(45) Date of Patent: Aug. 3, 2021

(54) DIGITAL SCREENING PLATFORM WITH PRECISION THRESHOLD ADJUSTMENT

(71) Applicant: Prime Research Solutions LLC, Flushing, NY (US)

(72) Inventors: Leonid Litman, Bronx, NY (US); Jonathan Robinson, Flushing, NY (US); Raphael Joseph Abberbock, Baltimore, MD (US); Cheskie Rosenzweig, Brooklyn, NY (US)

(73) Assignee: Prime Research Solutions LLC, Flushing, NY (US)

( * ) Notice: Subject to any disclaimer, the term of this patent is extended or adjusted under 35 U.S.C. 154(b) by 0 days.

(21) Appl. No.: 16/842,533

(22) Filed: Apr. 7, 2020

(65) Prior Publication Data

US 2020/0327506 A1    Oct. 15, 2020

Related U.S. Application Data

(60) Provisional application No. 62/832,336, filed on Apr. 11, 2019.

(51) Int. Cl.
| | |
|---|---|
| *G06Q 10/10* | (2012.01) |
| *G06Q 50/26* | (2012.01) |
| *G10L 15/26* | (2006.01) |
| *G09B 7/02* | (2006.01) |

(52) U.S. Cl.
CPC ....... *G06Q 10/1053* (2013.01); *G06Q 50/265* (2013.01); *G09B 7/02* (2013.01); *G10L 15/26* (2013.01)

(58) Field of Classification Search
CPC .. G06Q 10/1053; G06Q 50/265; G10L 15/26; G09B 7/02
See application file for complete search history.

(56) References Cited

U.S. PATENT DOCUMENTS

| | | | |
|---|---|---|---|
| 10,572,778 B1* | 2/2020 | Robinson | H04L 67/22 |
| 2010/0114666 A1* | 5/2010 | Brierley | G06Q 30/02 |
| | | | 705/7.42 |
| 2013/0019258 A1* | 1/2013 | Bhatia | H04N 21/44222 |
| | | | 725/13 |

(Continued)

OTHER PUBLICATIONS

Mittereder, Felicitas. "Predicting and Preventing Breakoff in Web Surveys." University of Michigan, Deep Blue, 2019. (Year: 2019).*

*Primary Examiner* — Andrew B Whitaker
(74) *Attorney, Agent, or Firm* — Weiss & Arons LLP

(57) ABSTRACT

Systems and methods for tuning a digital screen to provide high quality data are provided. Methods include determining a target level of participant data quality associated with accurate completion of an online survey, determining a participant screening threshold based on the target level of participant data quality, and adjusting a survey screen based on the participant screening threshold. Methods may achieve high data quality without sacrificing participant diversity. Methods may also include transmitting the survey screen to a computing device associated with a participant, and receiving a response of the participant to the survey screen on the computing device. When the response fails to achieve a predetermined threshold response, methods may include rejecting the participant from the survey.

26 Claims, 11 Drawing Sheets

(56) References Cited

U.S. PATENT DOCUMENTS

| | | | | |
|---|---|---|---|---|
| 2014/0006042 A1* | 1/2014 | Keefe | ................... | G16H 10/20 |
| | | | | 705/2 |
| 2015/0186923 A1* | 7/2015 | Gurumoorthy | .... | G06Q 30/0242 |
| | | | | 705/14.42 |
| 2015/0302436 A1* | 10/2015 | Reynolds | ........... | G06Q 30/0201 |
| | | | | 705/7.32 |
| 2019/0244228 A1* | 8/2019 | Turner | ............... | G06Q 30/0205 |
| 2020/0013076 A1* | 1/2020 | Rinzler | ............. | H04N 21/4788 |

* cited by examiner

Data Quality Screener https://.com

1. File is most associated with
   - ○ sleeping — 905
   - ○ passion — 907
   - ● format — 909
   - ○ yoga — 911

2. Teaspoon is most associated with
   - ● flour — 917
   - ○ jazz — 919
   - ○ ask — 921
   - ○ bench — 923

[Submit]

FIG. 9

DIGITAL SCREENING PLATFORM WITH PRECISION THRESHOLD ADJUSTMENT

CROSS REFERENCE TO RELATED APPLICATION

This application is a non-provisional of U.S. Provisional Patent Application No. 62/832,336 filed Apr. 11, 2019 entitled "DIGITAL SCREENING PLATFORM WITH PRECISION THRESHOLD ADJUSTMENT" which is hereby incorporated by reference herein in its entirety.

Commonly assigned U.S. patent application Ser. No. 16/354,437 entitled "MACHINE-LEARNING-BASED SYSTEMS AND METHODS FOR QUALITY DETECTION OF DIGITAL INPUT," filed on Mar. 15, 2019, is hereby incorporated by reference herein in its entirety.

FIELD OF TECHNOLOGY

Aspects of the disclosure relate to digital platforms. Specifically, aspects of the disclosure relate to digital screening platforms for filtering candidate profiles.

BACKGROUND OF THE DISCLOSURE

In recent years, market research and research in the social and behavioral sciences (collectively referred to as human participants research) has undergone a profound transformation. The transformation consists of an increase in online participant recruitment practices, as well as a proliferation of resources for creating methodologically diverse studies and disseminating them online. Online research makes it possible to study human behavior in new ways, at scales not possible in more traditional research settings. Attesting to the size of the online human participant industry, the online market research industry currently constitutes 29% of a $20 billion market (*IBIS* World, 2018), and most peer-reviewed research articles in the top scientific social and behavioral research journals utilize at least some online participant recruitment.

Millions of people around the world act as participants online each year, providing hundreds of millions of data points that are analyzed by businesses and academics. Data collected online shapes our society. This data is the source of market-shifting business decisions. This data determines what ideas new researchers will dedicate their lives to investigating and what ideas are deemed failures not worth exploring further. Good data allows researchers to draw accurate conclusions about the questions they are trying to answer. Bad data leads to erroneous conclusions that can have large detrimental impacts on society. It is critically important that this data is of good quality.

Data quality is a multi-dimensional concept that incorporates several key elements, but in order for data to be of high quality, participants must be utilizing some basic set of internal resources when answering questions. They must be paying attention to the question, capable of understanding the question, and choosing to respond in an effortful and non-random fashion to the questions they are being asked.

Maintaining data quality has been a problem for the online research industry. Many online participants do not pay attention to the survey, do not carefully read instructions, and may even provide completely random responses to survey questions. Multiple studies have examined data quality on market research platforms and have found very high levels of inattentiveness among large numbers of participants (Courtright and Miller, 2011; Downes-Le Guin, Mechling, & Baker, 2006; Hays, Liu and Kapteyn, 2015; Kees, Berry, Burton & Sheehan, 2017; Thomas & Clifford, 2017). Studies typically report that close to 50% of respondents are inattentive (Kees, Berry, Burton & Sheehan, 2017).

Due to the significant concerns about data quality on market research platforms, it is important to screen out inattentive participants in order to preserve the validity of the collected data. However, a downside of many screening techniques is that they may preserve validity at the expense of diversity in the participant pool.

For at least these reasons, it would be desirable to provide systems and methods for screening participants, for surveys and other tasks, in a way that improves data quality. It would be further desirable for the systems and methods to maintain participant diversity.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 9 shows an illustrative screenshot in accordance with principles of the disclosure;

DETAILED DESCRIPTION OF THE DISCLOSURE

Figure 1:
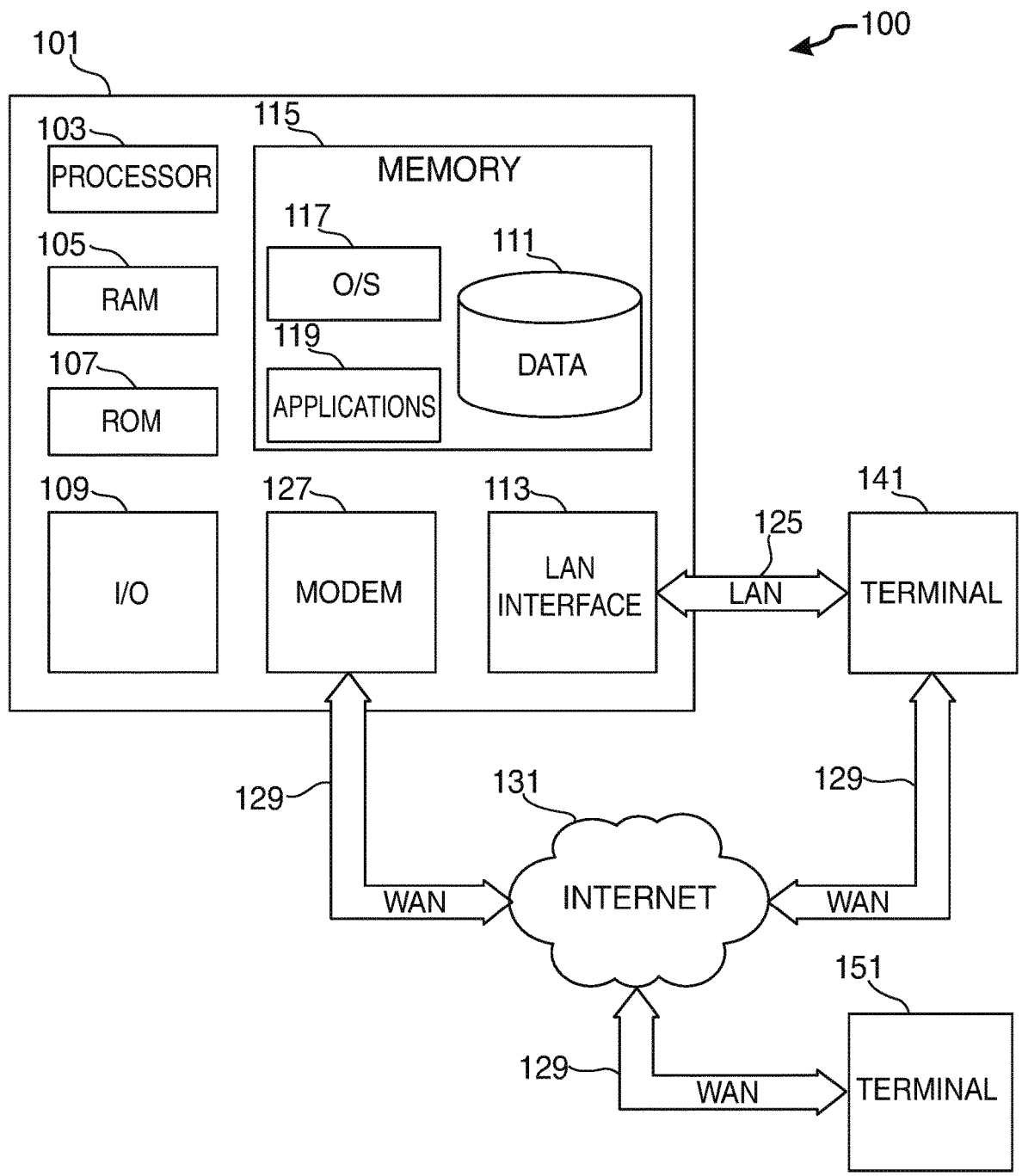
FIG. 1 shows an illustrative system in accordance with principles of the disclosure.

Aspects of the disclosure address challenges encountered in online data collection. In online data collection, participants may be multitasking, minimally focused on the task, or altogether inattentive to the study they are taking. They may also not be capable of comprehending language in a study, or may be comprehending, but responding randomly, perhaps because they do not want to put in the effort to respond to questions accurately. To counter this, researchers often use attention checks. Responses to these checks are typically used to reject participants from the study and exclude their data from analysis. These checks generally intend to measure elements of data quality, including attention, language comprehension, and effortful or non-random responding. Examples of some extant attention checks used in online research include: instructional manipulation checks; experimental manipulation checks; logical statements; consistency checks; general knowledge questions; consistent responding to reverse scaling; open-ended responses; and page meta-data. These checks have different strengths and weaknesses in terms of their usefulness in screening participants and achieving samples with good data quality.

Instructional manipulation checks (IMCs) may be used to measure attention in multiple-choice questions (MCQs). IMCs may explicitly instruct participants to select a certain response, in order to test whether participants are reading questions and following instructions. The instructions can be easy (e.g., "Please select 'Disagree' for this question") or more difficult. The level of difficulty may be determined by the length of the instruction and the effort required in responding to the instruction.

One type of IMC attention check commonly used in research studies may include inserting a paragraph and asking participants to answer a question based on the paragraph's content. Often, intentional misdirection is used by presenting information at the top of the paragraph, making it seem that reading the text in its entirety is not necessary. For example, in the paragraph below, a participant is made to think that they need to indicate their favorite hobby. However, the actual question requests participants to select "Reading Instructions," even if that is not an appropriate answer to the question.

> Most Favorite Hobby: Most modern theories of decision making recognize the fact that decisions do not take place in a vacuum. Individual preferences and knowledge, along with situational variables can greatly influence the decision-making process. In order to facilitate our research on decision making, we are interested in knowing certain factors about you, the decision maker. Specifically, we are interested in whether you actually take time to read the directions; if not, then some of our manipulations that rely on change in the instructions will be ineffective. So, in order to demonstrate that you have read the instructions, please select "Reading Instructions" from the list below, instead of any other hobbies that you may have.
> Fishing
> Movies
> Gardening
> Reading instructions
> Walking
> Exercise
> Music
> Do not enjoy hobbies Experimental manipulation checks (EMCs) may test participants' attentiveness to the experimental manipulation (e.g. "For the preceding scenario, please indicate your role within the firm described."). As such, these may be more applicable for survey experiments. However, EMCs rely on memory more than they do on attention. For many experimental manipulations, understanding the gist of the manipulation may be enough to influence participants' decisions.

Logical statements, like "At some point in my life I have drunk water," embedded in questionnaires can be a good measure of attention. However, there is no systematic review of the efficacy of logical statements. In some cases, if the questionnaire is part of the experimental stimuli, researchers may not want to use an embedded logical statement so as to reduce any interference with the experimental effect.

Consistency checks may ask participants the same question at different points in a survey. Any discrepancy in response may indicate a likelihood of random responding.

General knowledge questions, e.g., "What is the capital of the United States of America," may be embedded in a survey to test inattention. However, this relies on the assumption that all respondents will know the correct answer. This assumption may exclude less educated participants.

Consistent responding to reverse scaling may test internal reliability of a scale. If a participant is reading the questionnaire, they should have responded to the reverse-coded items oppositely. The test may, for example, use Cronbach alphas (i.e., a function used as an estimate of the reliability a psychometric test). Proper reading and responding would therefore lead to high internal reliability.

Open-ended response tests are often individually assessed for quality by a reviewer who might decide to exclude certain respondents from some or all analyses. Often there are no objective and clear criteria, but if participants provided open ended responses that are deemed to be incoherent, not task related, or otherwise inappropriate they may be excluded.

Page meta-data may be used to discover participants who are going through a survey at a rate deemed to be "too quick" by researchers, either based on assumed estimates or pilot data. Page meta-data may also indicate other suspicious activity that may raise questions regarding the quality of certain responses. There is however, wide variability in individual response speed even among those paying attention.

Other attention checks may ask participants to recall elements of the survey, including certain questions and materials that were presented in the course of the study. Again, these kinds of checks may be testing respondents on characteristics not necessarily relevant to data quality, such as memory, instead of comprehension and attention.

A good data quality check would allow researchers to remove bad data, and retain data that can be accurately interpreted to answer the questions that the survey set out to answer. Broadly, there are a few primary problems with many existing data quality checks.

One issue relates to the problems faced with reusing data quality checks. Many online survey participants take hundreds of surveys during the course of several months. These participants can be exposed repeatedly to the same data quality checks, sometimes at the beginning of a survey. These participants learn to identify IMC's, and repeated logical statements, consistency checks, and general knowledge questions, so that they perform better on these questions even when the rest of their data quality is at an insufficient level.

Another problem relates to the fact that difficulty levels and cutoffs are not well-established. How hard should a question be? In the "Hobby Question" example above there is a long paragraph of text that readers must read to the end in order to know how to respond correctly. If participants had to read six paragraphs of text to get the question correct, would the resulting data be better? Check questions should be tested meticulously to make sure that they are removing the correct people, and that they are not removing additional people for other reasons. If questions are overly difficult, researchers end up with a biased sample which does not allow them to generalize from the data they collected accurately.

For example, if a question is difficult because it uses sophisticated vocabulary to check participants, the resulting sample composition will likely be heavily biased toward the highly educated. Using open-ended questions and applying subjective cutoffs can also lead to researcher bias as to who gets eliminated. When relying on page meta-data, a stringent cutoff assuming that participants who respond quickly are responding randomly can lead to removing data from an important segment of the population who answer questions quickly and intuitively but accurately.

Additionally, many data quality checks may be measuring elements of participant responding that are not directly relevant to data quality. Many conventional data quality checks may not be reflective of elements of data quality such as attentiveness, non-random responding, and language comprehension, and may instead measure IQ or memory which may not be as relevant to high quality data.

Indeed, online market research platforms are competitive environments in which earnings are maximized by the speed of task completion. Processing speed, memory (EMC's), reading ability, as well as educational preparedness, play a role in the ability to pass many of the tasks used by researchers to identify quality responses. When questions become less about attention, non-random responding, and the capacity to understand the items in the actual survey, researchers may retain and use data that is from a biased sample.

In the majority of social and behavioral research studies, participants engage in tasks where determining attentiveness (attentiveness is used here, and elsewhere herein, as one element to represent data quality in general) is difficult. Attention manipulation checks correlate with each other at fairly low levels (Paas, Dolnicar & Karlsson, 2018) and are not always reliable indicators of attentiveness and effort (Hauser & Schwarz, 2016). Indeed, the reliability and validity of many attention checks are often not assessed empirically. Many researchers rely on their intuition to determine what kinds of catch trials are appropriate and often use attention checks that are hard to pass even by well-meaning and attentive participants. Attention checks, such as those presented above, are often overly difficult, screen out more participants than necessary, and bias the sample in ways discussed below.

One basis for the bias associated with conventional attention checks is the Diversity-Validity Dilemma ("DVD"). DVD refers to the inverse correlation between demographic diversity and validity when certain measures are used to select a group from a pool of candidates. For example, many selection processes and instruments that employ measures of cognitive and psychological ability often bias the selected groups along racial/ethnic, educational, gender, age, and socioeconomic divides (Valencia & Suzuki, 2001; De Soete, Lievens, Oostrom & Westerveld, 2013; Heuvelman, Nazroo & Rai, 2018, Bedard & Cho 2010, Beattie & Morrison, 2018).

In particular, there is a performance gap between racial and/or ethnic groups on measures that are commonly used to predict cognitive ability and meritocratic success, like standardized tests, IQ tests, and performance in educational institutions (Stephenson et al, 2016). This leads to bias in conventional screens used for vetting applicants for certain tasks, such as in college admissions and in the hiring process (Valencia & Suzuki, 2001; Druart, De Soete & Lievens, 2012; Heuvelman, Nazroo & Rai, 2018).

The DVD affects the online research industry as well. The use of conventional attention checks to reject participants has been found to result in passage rates that are correlated with race, socioeconomic status, education, and other demographic factors. As such, attention checks, and other data quality checks, used in online market research pose the same problem as cognitive tests do in traditional marketplaces.

Furthermore, as mentioned above, online market research platforms are competitive environments in which earnings are maximized by the speed of task completion. Participants often attempt to complete as many tasks as they can and to perform those tasks as quickly as possible. Processing speed, reading ability, and educational preparedness play a role in the ability to pass many of the tasks conventionally used by researchers to identify quality responses. Therefore, certain groups of participants, particularly those with higher educational level and socioeconomic status ("SES"), are often better prepared to perform well on such attention checks. Conversely, participants with a low level of education and SES are less likely to pass these tasks.

Thus, data quality checks that are currently utilized in the market research industry do not reject participants simply based on pure data quality characteristics, such as lack of attentiveness to task demands. Rather, the checks are often overly cognitively taxing and may be correlated with high levels of educational preparedness and SES. This leaves participants from certain racial and ethnic groups, as well as participants from lower socioeconomic status, at a disadvantage.

Aspects of the present disclosure provide systems and methods for screening that provide high quality data while alleviating the DVD problem described above. System and methods may include a screener. A screener (or survey screen) may be used herein to refer to a test, or other set of criteria, that may be used to determine suitability of an applicant for a task. The task may be a survey, or any other suitable task. Some preferred embodiments may screen applicants to be participants in an online survey. Other embodiments may screen applicants for an employment position, or for any other suitable task. Other exemplary tasks may include a video interview, participation in a clinical trial, or the development/testing of cognitive batteries (e.g., a test designed to assess key cognitive abilities including attention, concentration, verbal learning and memory, verbal fluency, working memory and executive function as well as global cognitive functioning). It may, for example, be important for the participant to understand the language of the interview or clinical intervention and be capable of being attentive and providing accurate information during these follow up tasks.

Advantages of the systems and methods disclosed herein were validated with research studies. The studies included comparisons between conventional quality checks and the disclosed platform (e.g., a platform that includes code such as that shown in Tables C, D and E, infra). For the purposes of this research approximately 550 participants were recruited from market research platforms. Participants answered questions in the research study survey. The questions included both versions of data quality checks.

The resulting data quality was analyzed based on multiple measures of quality, including: internal consistency scores, analysis and scoring of open-ended question responses, and ability to correctly search for and identify the answer to a current events question. Results based on these quality measures were compared across participants who pass and fail based on conventional quality checks, and based on the quality screening solution of the disclosure. Table A below shows pass rates and data quality measures that resulted from this study. Results indicate that the disclosed quality check solution significantly outperforms conventional quality checks. The gap between participants identified as high and low quality is much greater based on the disclosed quality solution, indicating a more precise identification of participants who provide quality data.

TABLE A

Pass rates and data quality scores by Quality Check Group

|  | Total N Passed | Internal Consistency Scores | Open Ended Response Rating (1 = very poor 5 = excellent) | Current Events Question Correct |
|---|---|---|---|---|
| Conventional Quality Checks | | | | |
| Passed | 350 | .806 | 3.43 | 81.1% |
| Failed | 208 | .671 | 2.94 | 53.1% |
| Disclosed Quality Solution | | | | |
| Passed | 463 | .800 | 3.38 | 78.0% |
| Failed | 95 | .334 | 2.62 | 35.8% |

Data were additionally analyzed to examine the role that quality checks have in biasing samples toward those who are more educated and those who are not minorities. Data show that the disclosed solution did not strongly bias the sample in the way that conventional quality checks do (see Table B below):

TABLE B

Demographics by Quality Check Group

|  | Attended Some College | Percentage Minority |
|---|---|---|
| No Quality Checks | 70.9% | 24.6% |
| Passed Conventional Quality Checks | 76.7% | 20.0.% |
| Passed Disclosed Quality Solution | 72.7% | 23.3% |

The disclosed systems and methods may incorporate a tailored assessment on multiple dimensions relevant to data quality without being overly stringent. Some embodiments may include a self-replenishing bank of questions that may be automatically created by a trained algorithm. New questions may, in some embodiments, be created for each user. The questions may be designed to maintain a certain level of question difficulty. The algorithm may be designed to find the optimal difficulty level that does not lead to screening out important segments of the population and is not overly biased by race or education level, yet is selective enough to provide researchers with high quality results.

The system may seek to circumvent the aforementioned issues with existing quality check tools used by researchers in online research studies to mark a participant's data as high or low quality. The dimensions of data quality concerns addressed by the system may include a) attention levels, b) language proficiency, c) effortful and non-random responding, d) participant engagement, and e) validity of responses. The system may include one or more of the following components: A) a security check which may remove suspicious participants (e.g., participants from suspicious locations), B) a predetermined number of check questions (e.g., four questions in one preferred embodiment) measuring a participant's capacity to correctly identify which word from a multiple choice list is most associated with a comparison word, C) an analysis of event behaviors to identify those with that are out of the norm, such as mouse movements, copy/paste actions, and reaction times, and D) a language proficiency engine which may determine if a participant is proficient in a preferred survey language (e.g., English, or any other suitable language) using various methods including NLP algorithms and answers to synonym and antonym questions. Performance across some or all of these dimensions may, in some embodiments, be summed into an overall quality score (N score). The quality score may be on a scale from 1-10, or any other suitable scoring scale. In other embodiments, one, some or all of the components may flag a participant as associated with poor data quality when the participant's performance as examined by that component fails to reach a certain threshold.

The system may include various computational engines (alternatively referred to herein as "modules"). The engines may process one or more data sets. The data sets may be generated based on digital participant activity. Examples of digital participant activity may include behavioral information, such as mouse movements and keyboard strokes. Examples of digital participant activity may also include responses to one or more questions presented to the participant. The questions may be part of a screener presented to the participant. The screener may be designed, chosen, and/or generated by one or more of the engines. The question/response format may include a radio, checkbox, freeform response question, or any other suitable format.

The engines may be used to analyze the data gathered from the participant and determine whether they should qualify to take the study. In some embodiments, the system may determine what engines should be used in processing a particular piece of data. Once the data is processed the system may determine based on the output of the various engines whether a participant should be allowed to proceed, or blocked from, a task, such as taking a study. The system may also determine that it is necessary to gather more information from the participant. In that case the system may gather more information to determine whether the participant should be allowed to take the study. The following paragraphs describe some exemplary computational engines that may be included in the system.

One engine may be a "security" engine. The security engine may use various metrics to flag participants that pose a potential security issue for a study. Some exemplary metrics that are considered include duplicate IP addresses within a particular study, participants coming from a proxy server, and participants using scripts to answer questions. The engine may use various techniques to prevent bots and automated behavior by using established tools such as Captcha or Recaptcha. The engine may also use event behavior analysis to determine that participants are not, for example, bots, or people "copy and pasting" answers.

One engine may be an "language proficiency" engine. The language proficiency engine may determine how well a participant is proficient in a particular language. The language proficiency engine may also function to flag participants who are inattentive or otherwise providing low quality data, without being overly restrictive and lowering the diversity of the participant pool.

In a preferred embodiment, the language may be English. The engine may use various methods to make its determination. Participants may be asked to write a paragraph based on a prompt and the engine may use NLP algorithms to gather various metrics such as grammar structure, vocabulary and writing ability. Additionally, a participant might be prompted to answer synonym and antonym questions to determine their grasp of the English language. The language proficiency engine may determine that a participant is above or below a predetermined threshold proficiency. In some embodiments, a participant who fails to reach a threshold proficiency may be flagged, and may be excluded from proceeding to the task. In certain embodiments, the data gathered may be used by the language proficiency engine to determine a score for a participant's language proficiency.

The score may be determined based at least in part on a difficulty level of the questions (e.g., synonym and antonym) posed.

The difficulty level of the questions, and/or the threshold used to determine whether a participant should proceed, may be determined based on a target level of participant ability desired for the survey. The target level may be predetermined, or, in some embodiments, may be determined in real-time for a particular survey. This engine may be extendable to any other suitable language.

One engine may be an "event behavior aggregation" engine. The event behavior aggregation engine may, in certain embodiments, use machine learning algorithms to determine the quality of participants based on events generated while interacting with the system. For instance, the engine may determine that the user is using automated tools to answer questions based on how long it takes the user to answer a question. The engine may also analyze mouse movements and keyboard activity generated by the user in determining a quality score. A threshold quality score may be needed for a participant to proceed. The threshold may be predetermined, or, in some embodiments, may be determined in real-time for a particular task. Furthermore, the event behavior aggregation engine may be applied during a screener phase, during an actual task (e.g., a survey), or both.

One engine may be an "association question engine." The association engine may use comprehensive machine learning to generate word association questions. The word association questions may be used as part of a screener to determine whether a participant should qualify for a study, or any other suitable task. The questions generated may test a recipient on the associations between words. The association questions may test respondent data quality in numerous ways, including participant capacity to understand the language used in the questions and answers, their ability to attend to the question stimuli, and ability to answer non-randomly. The questions may be further designed to test a participant's attentiveness, while not being overly difficult, thereby improving data quality while maintaining participant diversity.

The association question engine may include an algorithm that may, in some embodiments, include five phases. The five phases may include: 1) Compile and/or access corpus of data, 2) Filter the corpus, 3) Create a Word Association Model, 4) Create word pairs, and 5) Generate Questions based on the model. In some embodiments, the algorithm may include less phases, more phases, or different phase sequences.

The first phase may include compiling and/or accessing a corpus of data to be used as a word pool for generating association questions. The corpus may be chosen or compiled to include words commonly used and understood by the general population. In some embodiments, the corpus may be selected based on a target level of participant attentiveness. This phase may use one or more suitable corpuses, such as the Wikipedia corpus or the Google Web Trillion Word corpus. The corpus may include a list of suitable words to feed into the next stages of the algorithm.

The second phase may include preprocessing the data set. The data preprocessing may include removal of non-useful data such as stop words and other data that may not be useful or appropriate for generation of association questions. Some examples of stop words might be words like "his, the, because." Other non-useful words might include Capitals, contractions, and words that are from undesired parts of speech: count words, indefinite and possessive pronouns (mine, every, most), exclamations (ooh, ah, yes, goodbye), common adverbs (e.g., also, yet, much—some embodiments may remove the 20 most common adverbs), and conjunctions (afore, ere, insofar).

The data preprocessing may also include running the data set through a profanity filter to ensure that participants are not shown offensive words. In some embodiments, the data may not be preprocessed. In certain embodiments, the data may be processed, or filtered, at one or more other phases of the process.

The third phase may utilize a machine-learning (ML) model to determine word association scores. Words that appear frequently together may be weighted higher than words that do not appear together. The model may generate a value (alternatively referred to herein as an association value) for each word in a data set. The value may be a multidimensional vector that may be representative of the meaning and/or usage of the word. From the vector values for each word, the model may be configured to compute a similarity score between words.

For example, the model may be trained on a corpus of data. The model may be able to represent each word in the data set as a vector (this may be referred to as a word embedding). The embedding may contain many features of the word that together make up its multi-dimensional representation. The word embedding representation of the word can be used to figure out similarity between words in the data set. Words that are most semantically and contextually similar may be represented by similar vectors thus resulting in a high similarity score. Conversely, words that are not semantically similar will be represented by non-similar vectors and thus will result in a low similarity score.

The model may be trained at least in part using a data set to compute word association. In some embodiments, the ML model may be trained by the system itself, and may, in some embodiments, use as the data set the corpus compiled or accessed in the first phase. The data set may include words, sentences, and/or paragraphs that can be used to generate vector encodings. The encoding for each word contains information that can be used to determine association with other words.

The system may, in certain embodiments, self-determine which association model is appropriate to be used to generate a question for the participant. Different data sets may need to be used for different models. For example, if a low level of participant attentiveness is needed, a model may be used that is associated with a low level of vocabulary. The model, in turn, may be trained with a data set containing basic level words.

The ML model may take various inputs. Given two words it may determine their association score, which may represent a value for how closely associated the two words are to each other. Additionally, the model may take one word as input and determine words that are most closely associated and/or least closely associated.

At Phase 4, the system may create word pairs. Creating word pairs may include calculating word similarities. The engine may iterate through the word list of the corpus and use the model to generate a similarity score (alternatively referred to herein as a an association score) between each word and every other word on the list. This information may be stored in a database in order to generate questions for the screener. In some embodiments, words from the corpus may be input to the ML model, and the ML model may output a most similar word. The ML model may also output one or more other words that are less similar, or, in some embodiments, that are least similar.

This may form the basis for the fifth phase, the association question generator. The word-pair similarity scores may be used to generate a question. For example, the system may generate a multiple-choice question such that the participant is given a target, or base, word and asked which of multiple potential answers (alternatively referred to herein as comparison words) is most associated with it. The correct answer may be the comparison word which the model considers most closely associated with the base word. In some embodiments, a question may ask which word is least associated with the base word, with the correct answer being the comparison word which the model considers least closely associated with the base word. In yet other embodiments, the question generator may generate a question with no base word and only multiple comparison words. The participant may be prompted to select the comparison word that is least associated with the other comparison words.

The association question generator may, in some embodiments, randomly choose a 'base word' from the database of words. It may, in certain embodiments, check to ensure that there are in the database at least a predetermined specified number of similar and non-similar words to the base word.

A similar word may be one that is within a first predetermined range of association (alternatively referred to herein as within a "similar" range of association scores). For example, in an embodiment where an association score is a score from 0 to 1 with 1 being the most similar, the first predetermined range of association may be a range of scores that are predetermined to be considered similar. A non-similar word may be one that is within a second predetermined range of association (alternatively referred to herein as within a "non-similar" range of association scores). The second predetermined range may be a range of scores that are predetermined to be considered non-similar.

The first and second predetermined ranges of association may be non-contiguous. For example, a similar word may be a word with an association score greater than 0.75 with the base word, and a non-similar word may be a word with an association score less than 0.25 with the base word. Some other exemplary ranges for the first range of association scores may include: 0.65-0.75, 0.80-0.95, 0.60-0.75, or 0.70-0.80. Some other exemplary ranges for the second range of association scores may include: 0.00-0.10, 0.10-0.30, 0.25-0.40, or 0.10-0.20.

In other embodiments, the first and second predetermined ranges of association may be contiguous. For example, a similar word may be a word with an association score greater than 0.5 with the base word, and a non-similar word may be a word with an association score less than 0.5 with the base word.

If there are not enough similar or non-similar words to the base word, the program may choose a new base word. If there are enough, the program may randomly select words based on predetermined upper and lower bounds of similarity and non-similarity. For example, the system may choose one similar word and three non-similar words. In some embodiments, the system may choose two similar words and two non-similar words. In yet other embodiments, the system may choose three similar words and one non-similar word. The correct answer may be the word with the closest similarity. The correct answer may, in certain embodiments, be the word with the least similarity. Once all the words have been chosen the program may randomly shuffle the answer choices and format them into a question such as:

[baseword] is most closely associated with
1. [similarword]
2. [nonsimilar word 1]
3. [nonsimilar word 2]
4. [nonsimilar word n]

Another exemplary question may be of the form:
[baseword] is most closely associated with
1. [similarword 1]
2. [similarword n]
3. [nonsimilar word 1]
4. [nonsimilar word n]

A participant may be presented with a group of words (as described above) and be asked to identify associated words. The system may compute an association score for the participant based on the participant's responses. The score may be based, at least in part, on a difficulty level of the question. The system may use this score, at least in part, to determine participant eligibility. A threshold score may, in certain embodiments, be needed for a participant to proceed. The threshold may be predetermined, or, in some embodiments, may be determined in real-time for a particular survey. In other embodiments, the threshold may be a predetermined cutoff. An exemplary predetermined cutoff may be that a participant only proceeds to the task if he or she gets all, or all except one, of the association questions correct.

In another embodiment, an association screener may ask a participant to select a word from a group of four comparison words which does not belong with the others. Following is an illustrative example of this question form:
Which of the following words is not like the others?
1. delicious
2. motor
3. dessert
4. recipe The correct answer in the example above may be answer 2, motor, which is less associated with the other three than the three are with each other. An association screener in this embodiment may generate this type of question using the same corpus and model. The screener may generate the question by selecting three words that are within a predetermined "similar" range of association scores with each other, and a fourth word that is within a predetermined "non-similar" range of association scores with all of the other three. In some embodiments, an association screener may generate one or more question types described above (with a base word and four options of words most/least associated with the base word) and one or more questions of the type described in the previous paragraph.

Yet another related question type may be frequency based. This question type may be generated by a screener that may be referred to herein as a word frequency screener. This question type may be generated based on a corpus similar to the corpus used in the association screener. This question type, though, may test a participant's word recognition ability level. The question may ask the participant to identify which word from a list of four (or other suitable number of) words is least, or, in some embodiments, most, frequently used in the English language (or other suitable language). Frequency values may be derived for each word. A frequency value may, for example, be based on a tally of word instances in the corpus, or in any other suitable body of common word usage from which a frequency tally maybe derived.

The word frequency screener may, for example, generate a question by selecting one word that is frequently used and three that are not. The system may select three words that are frequently used and one that is not. The system may select one word that is very frequently used, two words that are relatively frequently used, and a fourth word that is infrequently used. The question may ask which word is most frequently used. The question may also ask which word is least frequently used. As an illustrative example, a question may proceed as follows:

Please select the word from below that is least commonly used in the English language:
1. levee
2. exhaust
3. day
4. nerve The correct answer to the question above may be answer 1, levee. In general, reference to an association question or screener may also be understood to refer to frequency-based questions. In some embodiments, a screener may mix and match from the different question types above. A screener may generate one or more frequency-based questions. The screener may also generate one or more questions that are association based as described in the preceding paragraphs.

In some embodiments, a difficulty level may be determined for the association engine. For example, the system may determine a target level of participant attentiveness and/or ability, and may generate the words for the association question based thereon. For example, if a low level of participant ability is determined, the system may use basic vocabulary level words for the questions. Moreover, the system may design the question such that the most similar word (i.e., the correct answer) is highly associated with the base word, and/or the incorrect selections are highly non-associated. If, however, it is determined that a high level of participant ability is needed, the system may design the question with words of advanced vocabulary. The system may additionally or alternatively present answer choices such that the correct answer is not highly associated with the base word, and/or the level of association of the correct answer is close to the level of association of one or more of the incorrect answers. The difficulty level may, in certain embodiments, be adjusted in real-time for a particular survey.

An overall score may, in some embodiments, be generated based on one or more of the metrics described above. Each engine may generate independent scores regarding the metric that the engine is designed to measure. For instance, the language proficiency engine may test a participant's grasp of the English language (or any other suitable language) and generate a score based on data which may be gathered from the participant. After gathering all the information, the system may analyze the information in real-time to generate a Qualifier score for that participant. This score may be used, individually or in combination with other scores, to determine if the participant should be forwarded to a study or back to the market research provider.

In some embodiments, one or more of the engines described above may be associated with a predetermined threshold level of performance. If a participant does not satisfy the threshold level, the participant may be prevented from proceeding to perform the task. If the task is already under way, the participant may be removed from performance of the task. Alternatively, data generated by the participant may be excluded from use (e.g., by a researcher in his or her research).

The system may analyze information gathered on this participant and determine if this participant qualifies to perform a task (e.g., a survey). Participants with a score that meets a certain threshold may be associated with high quality data [1], and may be allowed to continue to the task. The threshold may be one that matches the determined difficulty level of a given task. Different tasks may have different threshold requirements. For instance, a client running a writing intensive survey might want to target users with a writing level above a certain grade level. Alternatively, a fixed threshold may be used. The fixed cutoff may be predetermined to be most optimal in general, or on average, across a range of tasks.

The disclosed system thus provides an automated, precision tailored, data quality screen that solves many of the flaws existent with conventional data quality checks. The solution involves checks that may not have to be reused. The system has sufficient difficulty levels to ensure that participants who pass are attentive, are not responding randomly, and are capable of understanding instruction. The system is also capable of finding and removing bots or workers from suspicious locations. At the same time, these questions are not cognitively taxing, do not carry high memory load, and minimize bias toward those with high socioeconomic status and education.

Systems and methods in accordance with aspects of the disclosure may, in some embodiments, utilize computer executable code that may include snippets such as the exemplary code snippets shown in Tables C, D, and E below. The exemplary snippets may include specific logic, steps, data structures, etc. for implementing certain embodiments. The specific implementations are not meant to limit the scope of the disclosure. Rather, they are meant to illustrate exemplary embodiments. Any other suitable tools, libraries, algorithms, logic, and/or steps may be used to implement the methods and systems disclosed herein.

Table C shows exemplary code for one embodiment of a function that includes features of the disclosed processes shown and described herein. The function shown in Table C may, at least in part, access a corpus, preprocess the corpus, and create a model based on the preprocessed corpus.

TABLE C

```
def create_model(path_to_corpus):
    path = get_tmpfile(path_to_corpus)
    pre_process(path) # Removes Stop Words etc.
    model = train(path_to_corpus,size=vocab_size, min_count=1,
    workers=4)
    model.save( )
```

Table D shows exemplary code for one embodiment of a function that includes features of the disclosed processes shown and described herein. The function shown in Table B may, at least in part, calculate similarities and/or create word pairs among words in a corpus.

TABLE D

```
def findSimilarities(self, wordlist):
    model = load_model( )
    firstWordList = [ ]
    nextWordList = [ ]
    similarityList = [ ]
    wordStr = ' '.join(word for word in wordList)
    tokens = model(wordStr)
    for token1 in tokens:
        for token2 in tokens:
            try:
                firstWordList.append(token1.text)
                nextWordList.append(token2.text)
                similarityList.append(token1.similarity(token2))
            except:
                print('failed')
```

TABLE D-continued

```
wordPairs = pd.DataFrame( )
wordPairs['firstWord'] = firstWordList
wordPairs['secondWord'] = nextWordList
wordPairs['similarity'] = similarityList
saveWordPairs(wordPairs)
```

Table E shows exemplary code for one embodiment of a function that includes features of the disclosed processes shown and described herein. The function shown in Table E may, at least in part, generate questions based on the similarities that were calculated and/or word pairs that were created among words in a corpus.

TABLE E

```
def generate_questions(question_count):
    word_similarities = load_similarities( )
    questions = generate_random_question(word_similarities,
        question_count)
    return questions
```

A platform for precision filtering a pool of candidates is provided. A pool of candidates may include a group of one or more candidates attempting and/or applying to be admitted to perform and/or access a task. The pool may, in some scenarios, not be gathered in one location or at one time. The pool may include individuals independently attempting to access the task. They may be attempting to access the task one at a time and/or from different locations or systems. The task may be a survey. The survey may be administered in a non-digital medium. The survey may be digital. The survey may be administered online.

The platform may include computer executable code stored in non-transitory memory that may be run on a processor. The platform may be configured to generate, via an association testing module, a screener that is transmitted to a computing device associated with a candidate from the pool of candidates.

Generating the screener may include compiling and/or accessing a corpus of data. The corpus may include a set of words and/or sentences. The words and/or sentences of the corpus may, in some embodiments, be associated with a maximum threshold level of difficulty. For example, the words in the corpus may be categorized as "common" words. Common words may be words that achieve a predetermined level or frequency of use in a predetermined forum. Common words may be words classified as below a certain level of difficulty, for example words that generally are recognized even by segments of the population that are not college educated.

The platform may, in some embodiments, be configured to preprocess the corpus. The preprocessing may include removing unwanted words. Unwanted words may include profane words, stop words, and/or any other suitable inappropriate or non-useful words. In some embodiments, the corpus may not be preprocessed. In certain embodiments, other phases of the screener, such as word pairs or association questions, may be filtered for unwanted words.

The platform may be configured to create and/or access a word association model. The word association model may be a machine-learning (ML) model that may be trained to derive an association value for a given word. An association value may be a value that represents a meaning and/or quality of the word. The association value may be a multi-dimensional vector value.

The platform may be configured to generate one or more questions. The screener may include the one or more questions. Generating the one or questions may include applying one or more words from the corpus to the word association model. Each of the one or more questions may test a question recipient on an association between a base word and a plurality of comparison words. The comparison words may be presented in multiple choice form.

Generating the one or more questions may include compiling a set of word pairs. Each word pair may include two words from the corpus. In certain embodiments, the set of word pairs may include every combination of every word and every other word in the corpus. The system may feed the set of word pairs to the word association model. The system may derive, via the word association model, an association score for each word pair in the set of word pairs. The association score between two words may represent a level of association between the two words. The association score may be based at least in part on the association values of the two words. Deriving the association score may include calculating a difference between the association values of the two words (e.g., a geometric distance between the vector values, or some other suitable measure of similarity between the association values). The association between the base word and the plurality of comparison words, on which the participant may be tested, may be based, at least in part, on the association scores. In some embodiments, a base word may be fed to the association model, and the association model may output one or more most similar words and/or one or more least similar words for use as comparison words.

Generating each of the one or more questions may, in certain embodiments, include selecting the base word from the corpus. In some embodiments, the base word may be selected at random. Generating the question may also include selecting a number (e.g., four) of comparison words. In some embodiments, the four comparison words may include one comparison word that is within a first, "similar," range of association scores to the base word, and three comparison words that are each within a second, "non-similar," range of association scores to the base word. In other embodiments, the four comparison words may include two comparison words that are each within the first range and two comparison words that are each within the second range.

The platform may be configured to receive a response of the candidate to the screener. The platform may be configured to score the candidate at least in part based on the response. The platform may be configured to accept the candidate when the score satisfies a predetermined threshold score, and reject and/or flag the candidate when the score fails to satisfy the predetermined threshold score. Rejecting the candidate may prevent the candidate from proceeding to the task. Rejecting the candidate may include removing the candidate from a task which the candidate has already begun. Flagging the candidate may allow the candidate to proceed and/or complete the task, while marking the candidate's performance or data from the task as suspicious or poor quality.

In some embodiments, a difficulty level of the screener may be adjusted based on a target level of data quality (which may, for example, include and/or be represented by candidate attentiveness). In certain embodiments, the predetermined threshold score may be adjusted based on a target level of data quality. The target level of data quality may be associated with accurate completion of a predetermined task. The predetermined task may be a survey.

Accurate completion of a survey may include a sufficient level of participant attentiveness, non-random responding, and/or language comprehension.

In some embodiments, the difficulty level of the screener and/or the predetermined threshold score may be adjusted dynamically. Dynamic adjustment may include adjusting in real-time—while, or just before, the survey is being deployed or taken. Dynamic adjustment may also include adjustment based on a variable, such as a measurement of survey difficulty, and/or a measurement of diversity and/or accuracy levels.

In certain embodiments, the platform may include one or more testing modules instead of or in addition to the association testing module. Another testing module may include a module that tests for a suspicious location of the candidate. Yet another module may include a language proficiency module that tests a language proficiency level of the candidate. Language proficiency levels may be determined via a synonym or antonym question, a behaviometric analysis, and/or natural language processing (NLP) analysis. Still another module may include an event analysis module that tests for suspicious activity of the candidate.

In some embodiments, the pool of candidates may be candidates to perform the predetermined task. The predetermined task may be to participate in an online survey. The target level of candidate attentiveness and/or data quality may be determined for every task in a set of tasks.

The platform may thus provide a precision filtering which may increase a likelihood that: participants who pass the screener and complete the task will respond attentively to the task, understand a language of the task, respond more effortfully and non-randomly to the task, and/or respond to the task without fraudulent activity.

A digital filtering system for providing quality data for a task while maintaining a level of diversity is provided. The system may include computer executable code stored in non-transitory memory. The code may be run on a processor. The system may include a screener module that tests a data quality level. The system may include an anti-fraud module that tests for fraudulent activity.

The screener module may be configured to generate a pre-task screen. The pre-task screen may be transmitted to a computing device associated with a participant. The system may be configured to receive a response of the participant to the pre-task screen. When the response fails to achieve a predetermined threshold response, the system may be configured to reject and/or flag the participant from the task. A difficulty level of the pre-task screen and/or the predetermined threshold response may be determined based on a target level of data quality. In certain embodiments, the task may be a survey. In certain embodiments, the system may determine the target level of data quality for every survey in a set of surveys. The determination may be performed dynamically and/or in real-time.

In some embodiments, the pre-task screen may include an association screener. The association screener may test an association ability level of the participant. The screener module may be configured to compile and/or access a corpus of data. The corpus may include a set of words and/or sentences. The screener module may create and/or access a word association model that is trained to derive an association value for a given word. The screener module may generate one or more questions for the association screener based at least in part on applying one or more words from the corpus to the word association model. Each of the one or more questions may test the recipient on an association between a base word and a plurality of comparison words.

The pre-task screen may, in certain embodiments, include a language proficiency screen. The language proficiency screen may test a language proficiency level of the participant. The language proficiency screen may include a synonym question, an antonym question, a behaviometric analysis, and/or natural language processing (NLP) analysis.

In some embodiments, the anti-fraud module may include a location testing module that tests for a suspicious location of the participant. The location testing module may, for example, check the IP address of the participant computing device against a database of suspicious IP addresses or suspicious IP address patterns or profiles. The anti-fraud module may, in certain embodiments, include an event analysis module that tests for suspicious activity of the participant. Testing for suspicious activity may include checking for a predetermined list of suspicious activity, e.g., a copy/paste event. Testing for suspicious activity may, in some embodiments, include a behaviometric analysis, and/or a natural language processing (NLP) analysis.

The screener module may be adjusted based on a participant screening threshold. The participant screening threshold may be based on a target level of participant attentiveness and/or data quality. The target level of participant attentiveness and/or data quality may be associated with accurate completion of the task.

Aspects of the disclosure include a method for configuring a survey screen. The method may, in some embodiments, include responsively tuning the survey screen. The survey screen may provide a valid and diverse online survey. Providing a valid and diverse survey may include providing a group of participants who meet a level of diversity and who will provide high quality responses. For example, some embodiments may seek to alleviate the bias associated with the extant tools used by social scientists to mark a research participant as good or bad in online research studies. The method may be executed by computer code stored in non-transitory memory and running on a processor.

The method may include determining a target level of participant attentiveness, or data quality in general, associated with accurate completion of the survey. For example, the target level of participant attentiveness of an online study may be determined to be a certain level from a choice of levels. The choice of levels may, for example, include "low," "medium," and "high," or a range of numbers, such as 1-5 or 1-10. In certain embodiments, the target level of participant attentiveness may be substantially equal across a set of surveys. In some embodiments, the choice of levels may include two choices, such as "low" and "high." When the study is a typical study, the target level may be determined to be, for example, a "low" target level of participant attentiveness. In some embodiments, this may be configured to be a default setting. In some embodiments, a user of the method, such as a researcher or administrator, may be presented with options to set the target level. The options may, in certain embodiments, be presented via a dashboard on a display of a computing device associated with the user.

The method may also include determining a participant screening threshold based on the target level of participant attentiveness. For example, to address the problem of participant inattentiveness on market research platforms, certain embodiments may include creating pre-study (or, alternatively, mid or post-study) screeners consisting of questions that test participants' basic English comprehension (such screeners may be alternatively referred to herein as including a language proficiency module). Such screeners may, in some embodiments, include a screener question consisting of a target word and four response options (some embodiments may provide a different number of options, such as 2, 3, 5, 6, or other suitable number), one of which is a synonym. In the scenario of a study with a "low" target level of participant attentiveness, target words of the screening questions may be specifically chosen and tested to be appropriate, in a preferred embodiment, for the fifth-grade level. A low target level may also use "common" words, e.g., words understood by most of the population, or words generally understood even by people without a college or high school education.

In one exemplary embodiment, the screener may consist of four questions that each present a target word. The participant may be asked to select a synonym from a number of options presented with each question. The target words of the screening questions may, for example, be taken from the Big Five Inventory, a commonly used personality scale. For example, one question may ask, "Which of the following words is most related to 'moody'?" Because most online studies require participants to read long questionnaires and to comprehend study instructions, participants who are not familiar with basic English words are not likely to adequately follow the instructions and complete the study. These items are also likely to screen out inattentive participants who provide responses without reading the questions. A CAPTCHA question may, in some embodiments, be included as an additional screening item.

Determining the screening threshold based on the target level may, in some embodiments, include a predetermined mapping. For example, a "low" target level may be mapped to a fifth-grade level threshold, and a "high" target level may be mapped to a higher threshold, e.g., high-school level. Other embodiments may use any other suitable participant screening threshold. Still other embodiments may apply the participant screening threshold to other screener modules, e.g., a word association screener described above, or any combination of such screening tools. In an embodiment which includes a word association screener, determining the screening threshold based on the target level may include mapping a higher level of "frequency of use" to a lower target level. This way, when a low target level is determined, the screener may use words that are more frequently use and are therefore recognized by people with lower levels of education.

The method may also include adjusting a survey screen based on the participant screening threshold. This may include building an actual screening test based on the determined participant screening threshold. For example, in an embodiment where a participant screening threshold is determined to be a "fifth-grade level" threshold, a survey screen may be automatically compiled using a library of vocabulary words established to be at the fifth-grade level. In an embodiment where the screening threshold is determined to involve a high "frequency of use," the survey screen may be compiled with a corpus, or a portion of a corpus, that is associated with a words that are commonly used.

The method may also include transmitting the survey screen to a computing device associated with a participant. The method may further include receiving a response of the participant to the survey screen on the computing device, and, when the response fails to achieve a predetermined threshold response, rejecting the participant from the survey.

Since online surveys (as well as other suitable tasks) may require participants to read questionnaires and to comprehend instructions, participants who are not familiar with basic English words are not likely to be able to adequately follow instructions and complete the study. Screens according to aspects of the disclosure, e.g., a screen based on commonly used words in the English language (such as fifth-grade level vocabulary words), may filter out such participants. Additionally, these screens may filter out inattentive participants who provide responses without reading the questions. At the same time, these screens are not cognitively taxing, do not carry high attentional or memory load, and do not require education beyond, for example, the fifth grade. Thus, these screens are tailored to route inattentive participants out of surveys while not being biased against attentive participants who are disadvantaged, e.g., participants with low levels of education, or from minority racial/ethnic groups or those from low SES backgrounds. Such screens may be especially well-suited to the use case of a survey, where the level of attentiveness associated with successful completion may not be so high. This may allow for lower thresholds of screens, which in turn may maintain high levels of diversity while maintaining validity and data quality.

In some embodiments of the method, determining the target level of participant attentiveness may be executed dynamically. In one example, the dynamic determining may include determining the target level of participant attentiveness for every survey in a set of surveys. Dynamic execution may also include real-time execution. For example, the target level may be determined for a survey at, or immediately prior to, the time that a survey is deployed onto a platform or taken by a participant.

In some embodiments of the method, adjusting the survey screen may be executed dynamically. In one example, the method may include determining a level of diversity across a plurality of participants in a survey, and, when the level of diversity is below a predetermined threshold level, adjusting the survey screen to raise the level of diversity. Adjusting the survey screen may include lowering the vocabulary level of a language proficiency screener. Adjusting the survey screen may include raising the "frequency of use" level of words in an association screener.

In another example, the method may include determining a level of accuracy (alternatively referred to herein as data quality) across a plurality of participants in a survey, and, when the level of accuracy is below a predetermined threshold level, adjusting the survey screen to raise the level of accuracy.

Determining levels of accuracy and/or diversity across a plurality of participants may include data gathered from the participants themselves or any other suitable data source, such as records or databases. Alternatively, the data may be generated through an analysis, such as natural language processing ("NLP") and/or behaviometrics. The analysis may be performed prior to a survey, after the survey, in real-time, or at any other suitable time.

In yet another example, the method may include balancing the levels of diversity and accuracy across a plurality of participants in a survey, and ensuring that both levels are above a certain threshold. This may include determining a level of diversity and a level of accuracy across the plurality of participants in the survey. When the level of diversity is below a predetermined threshold diversity level and the level of accuracy is above a predetermined threshold accuracy level, the balancing may include adjusting the survey screen to raise the level of diversity to be above the predetermined threshold diversity level while maintaining the level of accuracy to be above the predetermined threshold accuracy level. When the level of accuracy is below a predetermined threshold accuracy level and the level of diversity is above a predetermined threshold diversity level, the balancing may include adjusting the survey screen to raise the level of accuracy to be above the predetermined threshold accuracy level while maintaining the level of diversity to be above the predetermined threshold diversity level.

In certain embodiments, the method includes performing natural language processing ("NLP") analysis on one or more questions of the survey. In these embodiments, determining the target level of participant attentiveness may be based at least in part on the NLP analysis. For example, NLP analysis may show that the survey includes a high lexical level, and therefore needs a high target level, which may translate into a high level of survey screen.

In some embodiments, the method includes performing NLP analysis on one or more responses of the participant to the survey. In certain embodiments, the NLP analysis may be performed on participant responses to a pre-survey screener. Adjusting the survey screen may be based at least in part on the NLP analysis.

In certain embodiments, the method includes performing behaviometric analysis on one or more responses of the participant to the survey. The method may include adjusting the survey screen based at least in part on the behaviometric analysis.

For example, based on NLP and/or behaviometric analysis of a participant's responses, certain demographic features may be determined. These analyses may use any suitable method of NLP and/or behaviometric analysis, including those disclosed in a co-pending patent application entitled "MACHINE-LEARNING-BASED SYSTEMS AND METHODS FOR QUALITY DETECTION OF DIGITAL INPUT," which has been incorporated by reference herein in its entirety.

A survey screen may be adjusted based on the demographic features. For example, the demographic features may include age, gender, ethnicity, and/or educational level. The survey screen may be adjusted to include a level of complexity that tests the participant's attentiveness without presenting a challenge that the participant is likely to fail even if he/she is being attentive. For example, if the analysis determines that the participant did not complete high school, the screen may be adjusted to test at the fifth-grade level.

In some embodiments, the demographic features derived from NLP or behaviometric analysis may be used in generating word association questions and/or language proficiency question. The demographic features may also be used in scoring participants based on their responses to such questions. For example, males and females, or individuals from different generations, may attach different associations to some words.

Some embodiments may include a multi-tiered screening process, e.g., a two-tiered screening. In a two-tiered screen, the bias-minimalizing method steps described above may be a secondary screen. The method may further include executing a preliminary screen, and executing the secondary screen in response to a participant failing the preliminary screen. A two-tiered screen may be implemented, for example, when the preliminary screen has an advantage, such as simplicity, but also has disadvantages, such as tendency toward bias. Applying the disclosed bias-minimalizing method as a secondary screen may, in some embodiments, preserve the bias-minimalizing advantage while maintaining any advantages of the preliminary screen.

In some embodiments, the method may include a training phase. A training phase may include tuning the screen for one or more surveys to determine an appropriate screen that maintains validity and diversity. Information about the appropriate screen may be stored in a database for use in future surveys. For example, screen information may be stored in the database. The screen information may be mapped to target levels of participant attentiveness. When a subsequent survey is received, the method may include searching the database to see if screen information is stored that matches target level of the received survey. If a match is found, the stored screen may be used to create a screen for the received survey. If no match is found, the method may proceed with the steps described above to determine an appropriate screen for the received survey. Information about the determined screen may then be saved to the database for use by future received surveys.

For example, the survey of the method may be a first survey. The method may further include receiving a second survey, determining a target level of participant attentiveness associated with accurate completion of the second survey, and, when the target level of participant attentiveness determined for the second survey is the same as the target level of participant attentiveness determined for the first survey, adjusting a survey screen of the second survey based on the survey screen of the first survey.

In some embodiments, the method may be extendable to receive any number of additional surveys. The method may include updating a database with survey screen information of the first survey, and mapping the screen information to the target level of participant attentiveness of the first survey. For each additional survey received, the method may include determining a target level of participant attentiveness associated with accurate completion of said additional survey. When the target level of participant attentiveness of the additional survey is mapped to survey screen information in the database, the method may include adjusting a survey screen of the additional survey based on the mapped survey screen in the database. When the target level of participant attentiveness of the additional survey is not mapped to survey screen information in the database, the method may include determining a participant screening threshold based on the target level, adjusting a survey screen of the additional survey based on the participant screening threshold, updating the database with survey screen information of the additional survey, and mapping the information to the target level of participant attentiveness of the additional survey.

Some embodiments of the disclosed systems and methods may include one or more of the following features: (1) One or more engines to generate metrics and gather information about the participant, (2) Real-time analysis of the information using AI and Machine Learning, and (3) Mechanisms to prevent participants who do not satisfy a qualifier threshold from starting the survey in the first place, thus precluding them from contaminating the dataset.

A digital filtering system for providing a valid and diverse online survey is disclosed. The system may include computer executable code that runs on a processor. The system may be configured to determine a target level of participant attentiveness associated with accurate completion of a digital survey. In some embodiments, the target level may be predetermined. The system may also determine a participant screening threshold based on the target level of participant attentiveness. The system may also be configured to adjust a survey screen based on the participant screening threshold, transmit the survey screen to a computing device associated with a participant, and receive a response of the participant to the survey screen. When the response fails to achieve a predetermined threshold response, the system may be configured to reject the participant from the digital survey.

A method for precision filtering a pool of candidates is provided. The method may be executed by computer code stored in non-transitory memory and running on a processor. The method may include determining a target level of candidate attentiveness (or any other suitable metric of data quality, such as language proficiency, effortful and non-random responding, or any or any other suitable data quality related issue) associated with accurate completion of a task, determining a candidate screening threshold based on the target level of candidate attentiveness, and adjusting a digital screen based on the candidate screening threshold. The method may also include transmitting the digital screen to a computing device associated with a candidate and receiving a response of the candidate to the digital screen on the computing device. When the response achieves a predetermined threshold response, the method may include accepting the candidate for the task. When the response fails to achieve a predetermined threshold response, the method may include rejecting the candidate for the task.

An example of a task may include responding to a digital survey. Another example of a task may include an employment position. For example, a job recruiting platform may filter a pool of applicants for one or more jobs. Each job may be associated with a target level of participant attentiveness. For example, each job may be associated with a job category, and each job category may be mapped to a certain level. A screen may be adjusted for each job so that the level of the screen is sufficient to eliminate inadequate candidates, yet is not overly challenging, thereby maximizing diversity. In some embodiments, the screen may be a preliminary screen for a more extensive recruiting process. The more extensive recruiting process may include further screens, interviews, background checks, or other suitable pre-employment steps.

In some embodiments of the method, determining the target level of candidate attentiveness and/or adjusting the digital screen may be executed dynamically.

The method may include determining the target level of candidate attentiveness for every task in a set of tasks.

The method may include determining a level of diversity across a plurality of candidates accepted for the task, and, when the level of diversity is below a predetermined threshold level, adjusting the digital screen to raise the level of diversity.

The method may include determining a level of accuracy across a plurality of candidates accepted for the task, and, when the level of accuracy is below a predetermined threshold level, adjusting the digital screen to raise the level of accuracy.

The method may include determining a level of diversity and a level of accuracy across a plurality of candidates accepted for the task, and balancing the levels of diversity and accuracy to maintain both above certain thresholds. For example, when the level of diversity is below a predetermined threshold diversity level and the level of accuracy is above a predetermined threshold accuracy level, the method may include adjusting the digital screen to raise the level of diversity to be above the predetermined threshold diversity level while maintaining the level of accuracy to be above the predetermined threshold accuracy level. When the level of accuracy is below a predetermined threshold accuracy level and the level of diversity is above a predetermined threshold diversity level, the method may include adjusting the digital screen to raise the level of accuracy to be above the predetermined threshold accuracy level while maintaining the level of diversity to be above the predetermined threshold diversity level.

Some embodiments of the method may include performing natural language processing ("NLP") analysis on one or more questions of the task. Determining the target level of candidate attentiveness may be based at least in part on the NLP analysis.

Certain embodiments may include performing NLP analysis on one or more responses of the candidate. Adjusting the digital screen may be based at least in part on the NLP analysis.

The method may include performing behaviometric analysis on one or more responses of the candidate. Adjusting the digital screen may be based at least in part on the behaviometric analysis.

A platform for precision filtering a pool of candidates is provided. The platform may include computer executable code that runs on a processor. The platform may be configured to determine a target candidate level (e.g., candidate attentiveness, data quality, or any other suitable metric such as education level) associated with successful execution of a task (e.g., a survey, or a job) and determine a candidate screening threshold based on the target candidate level. The platform may be configured to score a candidate based on predetermined performance metrics. For example, the performance metrics may include a score on a screen or a test. The screen or test may be administered by the platform, or may be independent of the platform, e.g., a standardized test. In another example, the performance metrics may include an achieved educational level. The platform may be configured to accept the candidate when the score satisfies the candidate screening threshold, and to reject the candidate when the score fails to satisfy the candidate screening threshold.

In some embodiments of the platform, the candidate screening threshold being determined based on the target candidate level may include a mapping between a set of target candidate levels and a set of candidate screening thresholds.

In some embodiments, the platform may further include a machine-learning ("ML") process. The ML process may include a feedback loop wherein the mapping is dynamically updated based at least in part on historical data that includes candidate success rates for one or more tasks. For example, the platform may be initiated with a certain mapping. Based on the initial mapping, a certain threshold may be set, and a group of candidates may satisfy the threshold and be accepted for the task. Data about those candidates' performances may be used to adjust the threshold. For example, if the candidates perform poorly, the threshold may be raised. If the candidates are not diverse enough, the threshold may be lowered. The feedback loop may run continuously and/or indefinitely. Thus, the platform may provide a dynamically adjusted screening threshold that automatically converges on a precise level that maximizes validity while maintaining diversity.

A platform for precision filtering a pool of candidates is provided. The platform may include computer executable code that runs on a processor. The platform may be configured to determine a target candidate level associated with accurate completion of a task, determine a candidate screening threshold based on the target candidate level, and adjust a digital screen based on the candidate screening threshold. The platform may also be configured to transmit the digital screen to a computing device associated with a candidate, and receive a response of the candidate to the digital screen on the computing device. When the response achieves a predetermined threshold response the platform may be configured to accept the candidate for the task. When the response fails to achieve a predetermined threshold response, the platform may be configured to reject the candidate for the task.

Thus, aspects of the disclosure alleviate challenges in digital screening in multiple ways. Some embodiments include ecologically valid attention checks whose difficulty levels are tailored to match the tasks under investigation. These attention screens may be just difficult enough to test for attentiveness but not so cognitively demanding so as to make them biased. Certain embodiments include software to present such attentiveness checks for online market research studies in real time, to score performance in real time, and to route participants out of surveys in real time. The workflow of software may, in some embodiments, screen participants prior to the beginning of the survey, so as to route them out before the study begins.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to digital filtering screens. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server may not need to stream the data to the computer system. This may be beneficial for the computer system, because the retrieval may be faster than data-streaming. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to tunable digital screening platforms.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
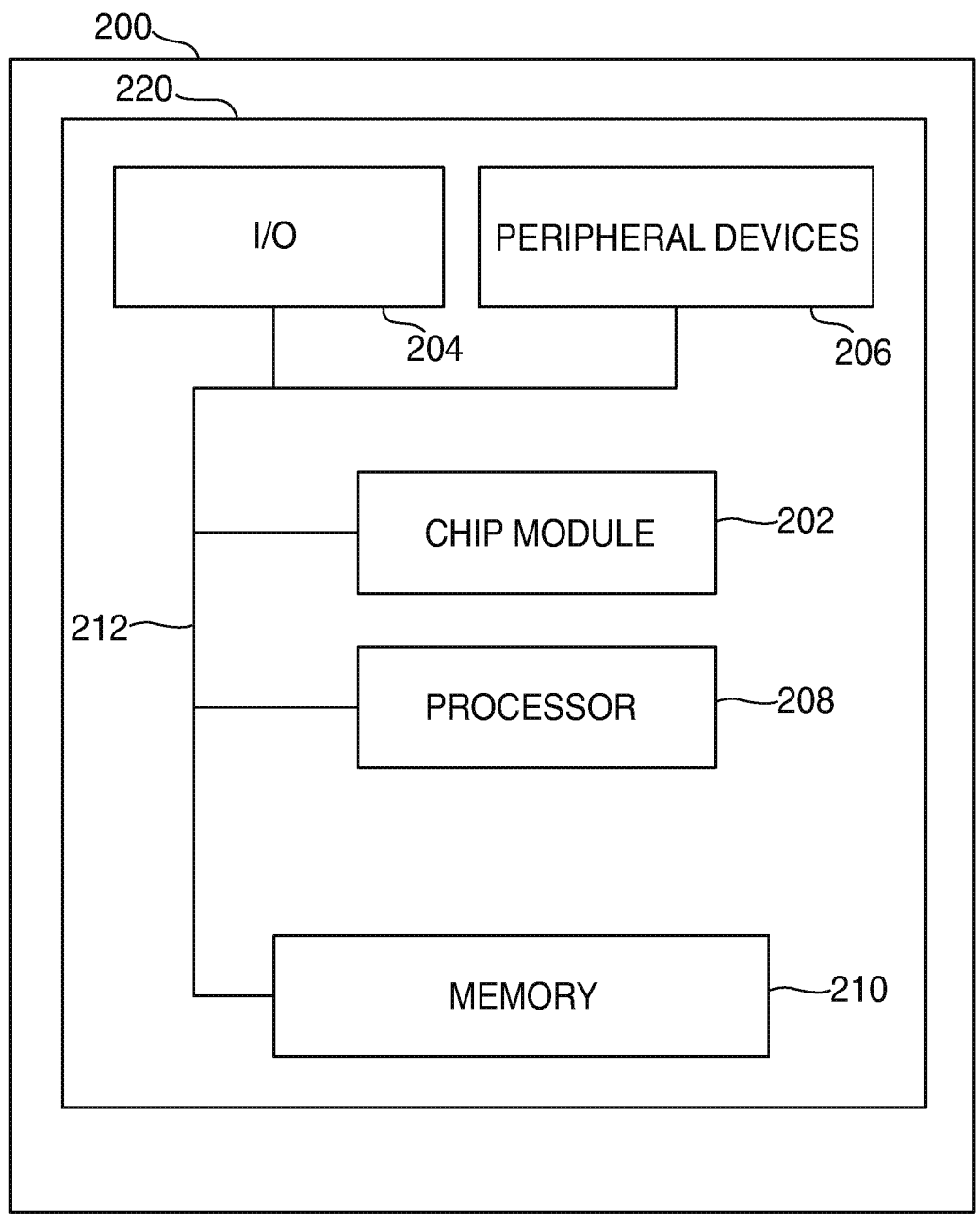
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
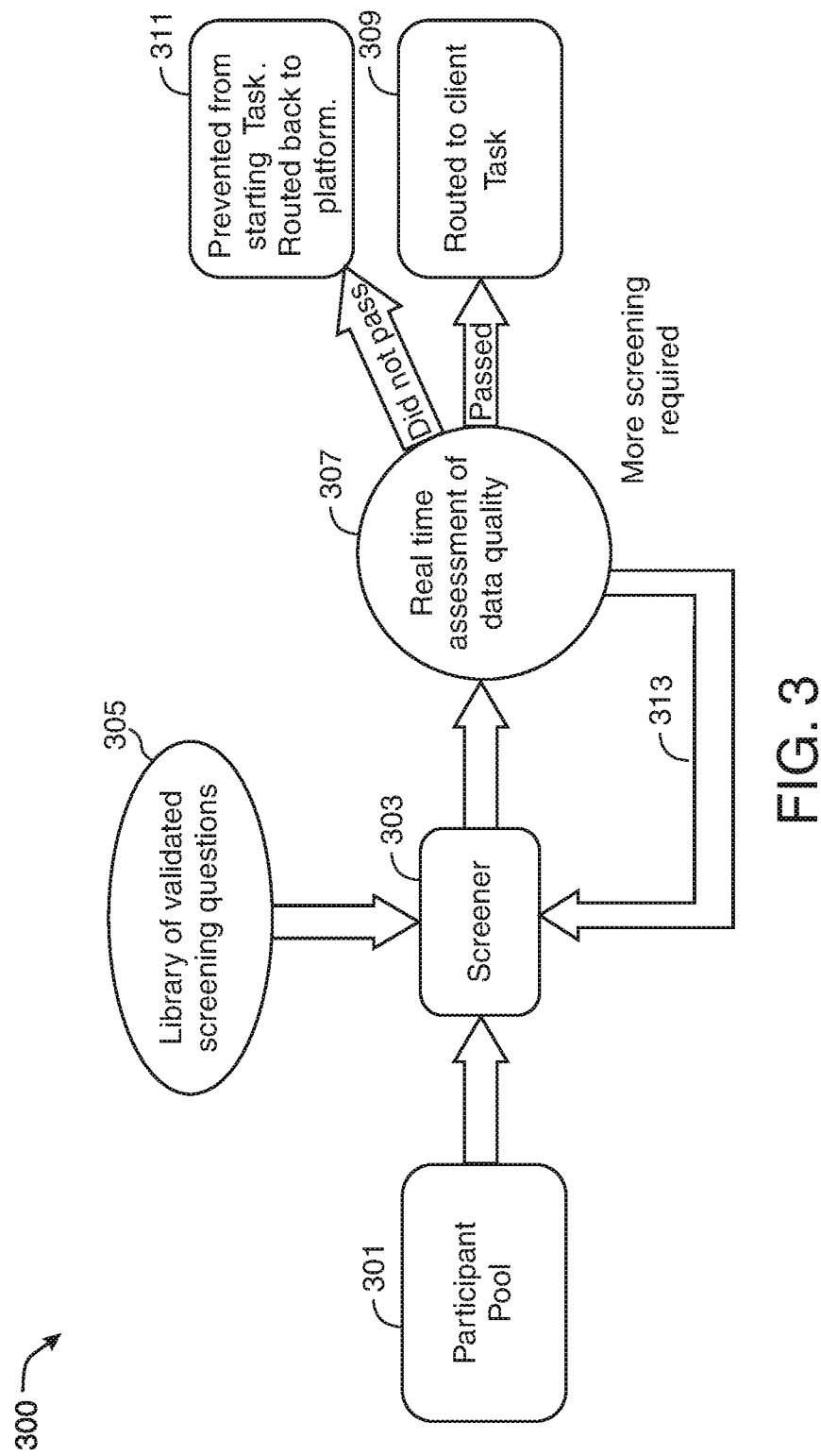
FIG. 3 shows an illustrative workflow in accordance with principles of the disclosure.

FIG. 3 shows illustrative workflow 300 according to aspects of the disclosure. Workflow 300 may provide one solution to the data quality problems prevalent in, e.g., online market research platforms.

Element 301 shows a participant pool applying for a task. In one example, participants may have been recruited by a market research platform to respond to a survey. Element 303 shows a digital screener. The screener may be supported by a library of screening questions, element 305. The library of screening questions may have been validated to measure attentiveness and/or minimize bias against minority groups and participants with low levels of educational attainment. For example, in one actual implementation of a language proficiency screener system, the library includes questions based on 500 words that meet certain criteria (e.g., fifth-grade level vocabulary). In certain embodiments, multiple libraries of questions may be used. For example, one library may include word association questions. Another library may include synonym questions. Yet another library may include instruction manipulation check (IMC) questions. The system may draw a certain predetermined number of questions from each library. For example, the system may draw two association questions, one synonym question, and one IMC question. In some embodiments, random sets of the questions may be used by the screener.

At element 307, the screener may provide real-time determination of data quality (e.g., attentiveness). The screener may be implemented pre-survey. If the participant passes the screen, he or she may be routed to the survey, element 309. If the participant does not pass the screen, he or she may be prevented from responding to the survey, element 311. (In some embodiments, the participant may be routed back to the research platform.) In certain embodiments 313, the system may determine at 307 that more data is required, and the system may reroute the participant back to the screener 303. Thus, the screen may prevent inattentive participants from starting the survey in the first place, and thereby prevent contamination of the dataset.

Systems and methods according to aspects of the disclosure may also include a system of linkage to host survey websites where participants may be recruited. Recruited participants may be routed to the disclosed screener. Those who pass may be rerouted back to the host survey. Other embodiments may send both those who passed the screener and those who didn't pass the screener back to the website where they may take part in the survey, but metadata may be included on each participant indicating their data quality level or score. The indicator may be flag indicating that the participant's data is likely low quality.

Figure 4:
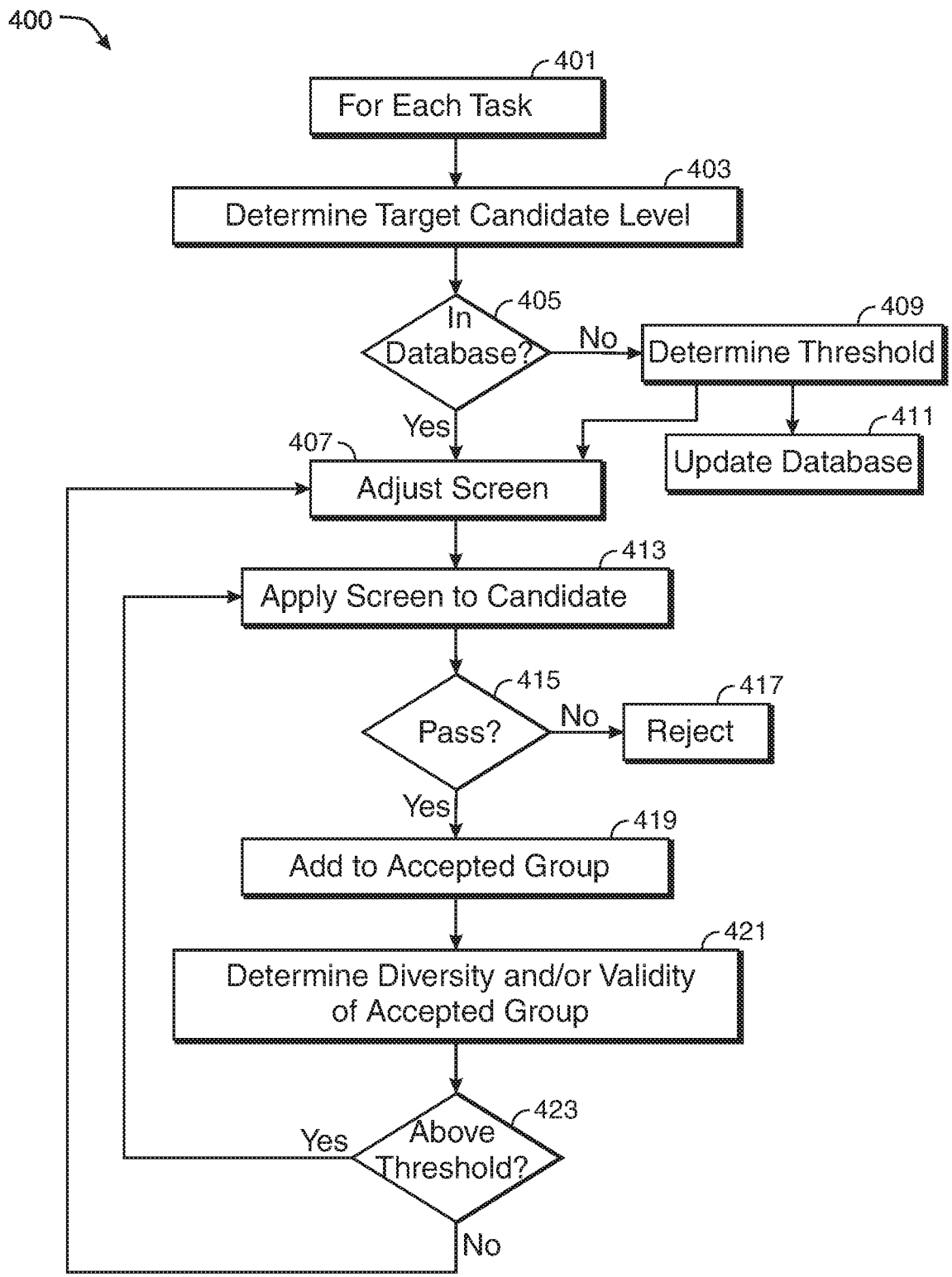
FIG. 4 shows another illustrative workflow in accordance with principles of the disclosure.

FIG. 4 shows illustrative workflow 400 according to aspects of the disclosure. Workflow 400 shows one embodiment, other embodiments may include other steps and/or sequences.

Step 401 indicates that workflow 400 may be executed for each task in a set of tasks. For example, the task may be a survey within a set of surveys. The set may be a closed set with a specific number of surveys, or, in some embodiments, the set may be open-ended and configured to expand. Additional surveys may be received as time progresses, and the workflow may be applied to each survey that is received. Workflow 400 may represent a real-time, dynamic, and continuously running implementation of aspects of the disclosure.

At step 403, a target candidate level is determined. Step 405 checks if the determined level is mapped to screen information in a database. If it is, at step 407 the screen for the current survey is adjusted based on the screen information in the database. If it is not in the database, a screening threshold is determined at step 409 based on the target candidate level. After the threshold is determined, the database is updated with screen information at step 411, and the screen is adjusted at step 407 based on the determined screening threshold.

At step 413, the screen is applied to a candidate. This step (and steps 415-423 that follow) may be done for each candidate in a pool of candidates who may be applying to be respondents for the survey. If the candidate does not pass the screen at step 415, the candidate may be rejected at step 417. Rejecting a candidate may include routing the candidate back to the pool of candidates, or to a survey respondent recruiting platform. Rejecting a candidate may also include flagging the candidate and/or disqualifying the candidate from other surveys.

If the candidate passes the screen at step 415, the candidate may be added to an accepted group at step 419. Being added to an accepted group may include allowing the candidate to complete the survey. Being added to an accepted group may also include adding survey responses of the candidate to a database for use in research.

At step 421, a level of diversity and/or validity may be determined for the accepted group. If the levels are above predetermined adequacy thresholds at step 423, the screen may be applied at step 413, followed by the subsequent steps, to other candidates for the same survey. If the levels do not satisfy predetermined adequacy thresholds at step 423, the screen may be readjusted at step 407 before being applied to additional participants at step 413.

Figure 5:
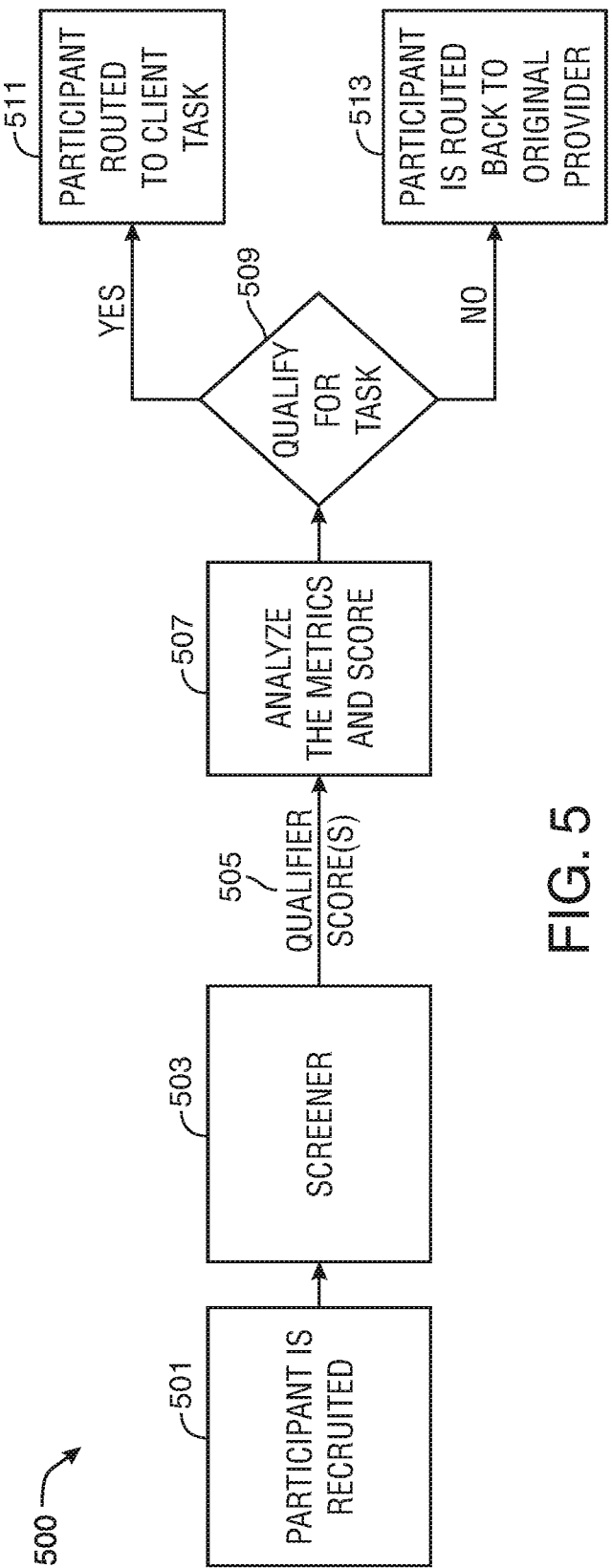
FIG. 5 shows yet another illustrative workflow in accordance with principles of the disclosure.

FIG. 5 shows illustrative workflow 500 according to aspects of the disclosure. Workflow 500 may represent an exemplary top-level diagram of a system for maintaining diversity and/or improving data quality in the performance of a task, e.g., an online survey.

A participant may be recruited by a market research platform at step 501. At step 503, the system may apply a screener to the participant. The system may generate a score (505) and/or other suitable metrics, and analyze them at 507. The system may compare the score to a predetermined threshold. The system may check the metrics for predetermined red flags. If the participant qualifies for a study (or survey, or other suitable task) at step 509, the participant may be routed to the study at 511. If the participant does not qualify for the study at step 509, the participant may be routed away from the study at 513. This may include routing the participant back to the original provider.

Figure 6:
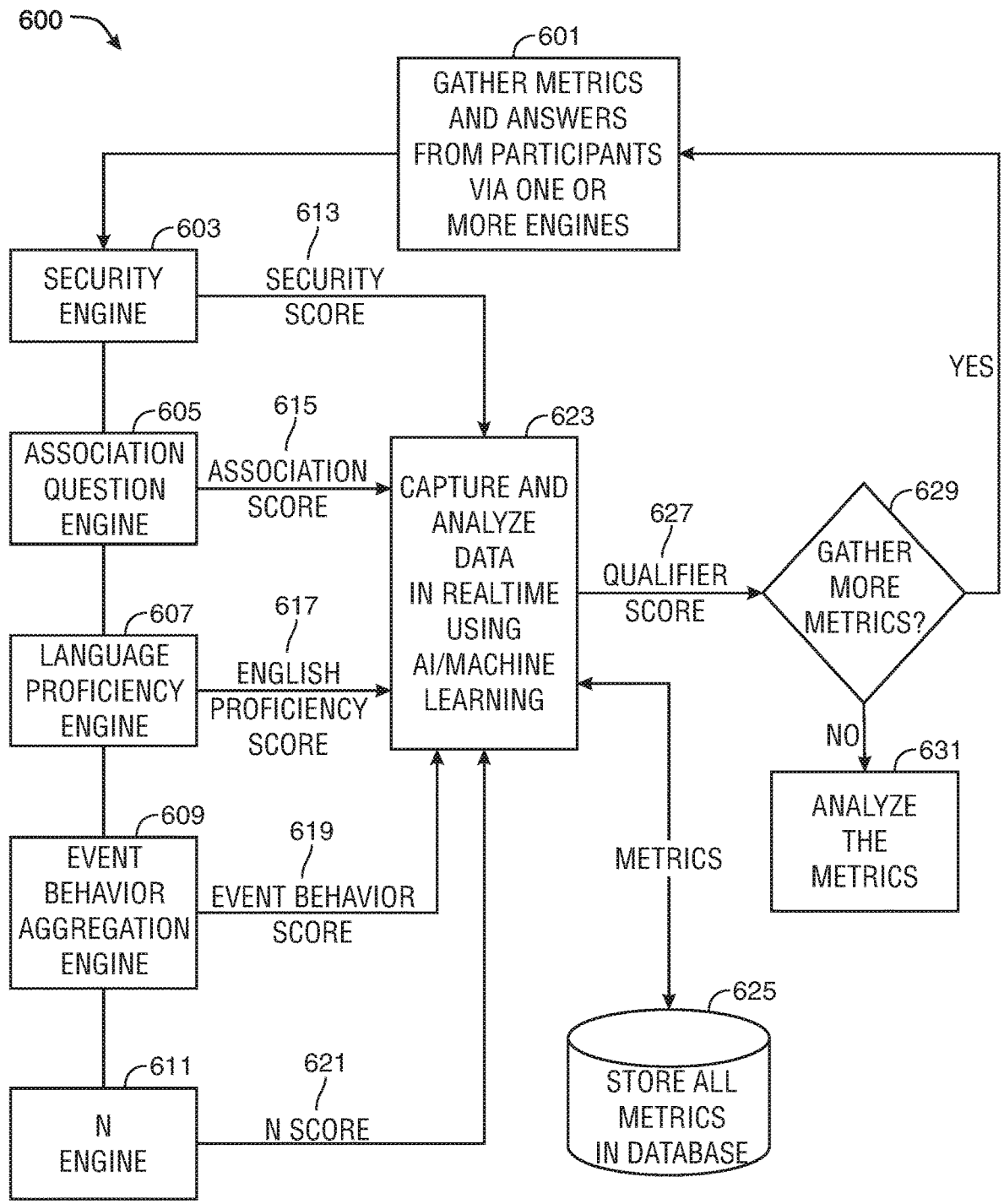
FIG. 6 shows still another illustrative workflow in accordance with principles of the disclosure.

FIG. 6 shows illustrative workflow 600 according to aspects of the disclosure. Workflow 600 may represent an exemplary diagram of a system for maintaining diversity and/or validity in an online survey.

At step 601 the system may gather metrics and/or responses from a participant via one or more computational engines (or modules). The engines may include security engine 603, association question engine 605, language proficiency engine 607, event behavior aggregation engine 609, N engine 611, and/or any other suitable computational engine.

Security engine 603 may test for threshold security risks. One example of a threshold security risk may include an IP address associated with a suspicious location. A suspicious location may include locations historically associated with fraudulent activity, locations currently participating in other surveys, or any other suitable indicator that a participant at that location may be fraudulent or otherwise unsuitable for providing accurate and valid survey responses. A threshold security risk may also be an indication that the participant is a bot. The system may generate a security score 613 based on the test. In some embodiments, discovery of certain predetermined security risks may be red-flag risks that may automatically route the participant out of the survey.

Association question engine 605 may generate a screener that may test a participant on an association skill level. The screener may provide a base word and a number (e.g., four) of comparison words, and the participant may be prompted to select the comparison word that is most associated with the base word. The system may generate an association score 615 based on the participant's response to the screener.

Language proficiency engine 607 may test a participant's proficiency in a certain language. The language may, in certain preferred embodiments, be English. Language proficiency engine 607 may use natural language processing ("NLP") as part of the test. Language proficiency engine 607 may provide a synonym-based set of questions to the participant as part of the test. The system may generate language proficiency score 617 based on the test.

Event behavior aggregation engine 609 may test certain events for suspicious activity of the participant. The events may include behaviometrics such as keyboard strokes and/or mouse activity. The suspicious activity may include a non-human participant, or a human participant who is not responding to the survey in an accurate and attentive way. The system may generate event behavior score 619 based on the test.

N engine 611 may generate N score 621. N score 621 may be a combinatory score based on two or more of individual scores 613-619. N engine 619 may combine the individual scores based on a predetermined equation. The predetermined equation may include an averaging of the individual scores. The predetermined equation may include certain weightings that give some of the individual scores more representational weight than other individual scores.

One or more of scores 613-621 may be analyzed at step 623. The analysis may be in real-time. The analysis may leverage artificial intelligence ("AI") and/or machine learning ("ML"). The system may also leverage and any other suitable metrics. The metrics may be accessed from and/or stored in database 625. The system may produce an overall qualifier score 627.

The system may make a determination at 629 if sufficient data and/or metrics are available to accurately assess the validity of the survey data provided by the participant. If insufficient, the system may loop back to 601 and gather more data and/or metrics. If sufficient at 629, the system may, at 631, perform a final analysis of the metrics and/or scores to determine whether to route the participant to or away from the survey.

Figure 7:
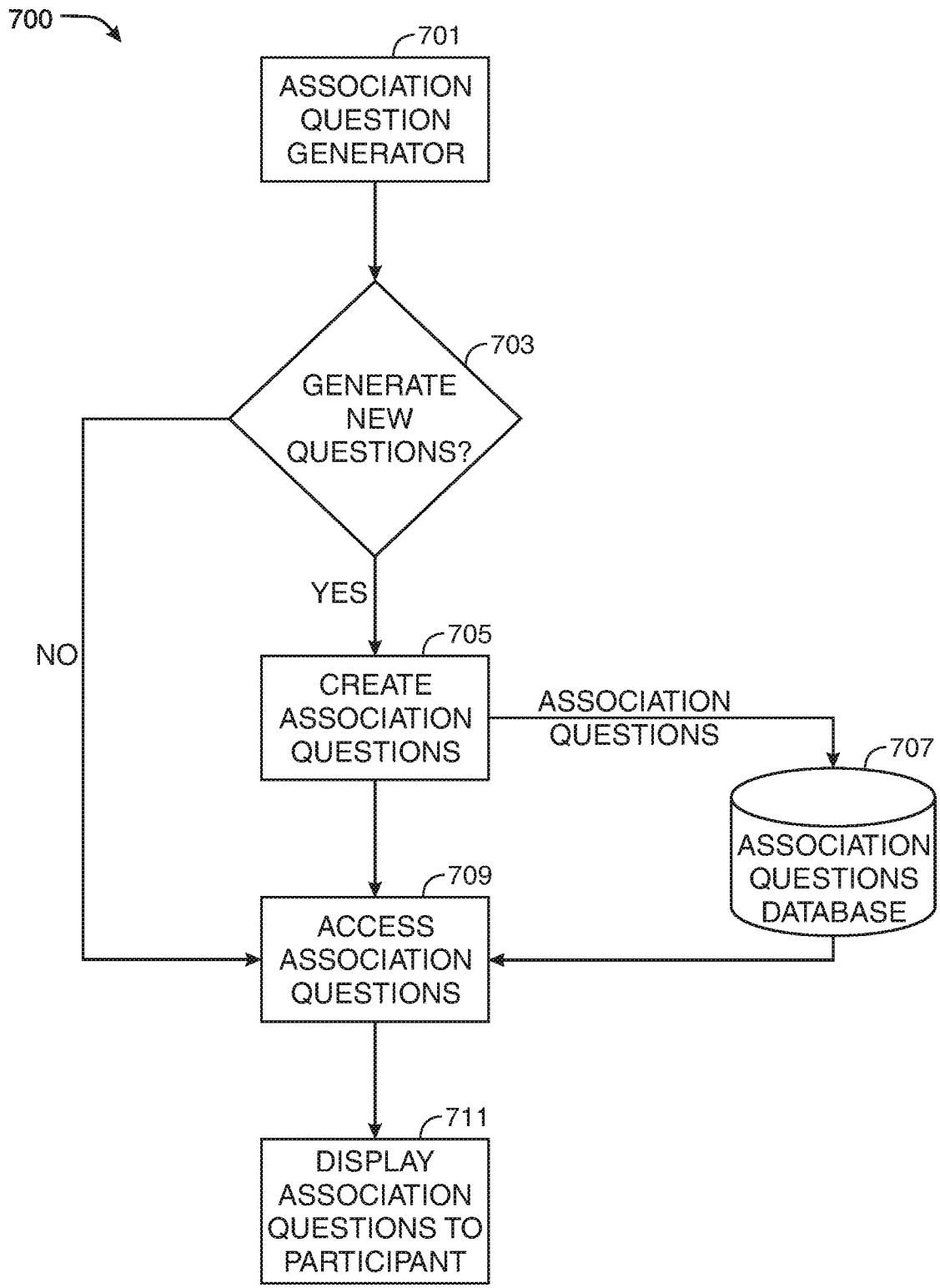
FIG. 7 shows another illustrative workflow in accordance with principles of the disclosure.

FIG. 7 shows illustrative workflow 700 according to aspects of the disclosure. Workflow 700 may represent an exemplary top-level diagram of an association question module that may be part of a system for maintaining diversity and/or validity (e.g., increasing data quality) in a task such as an online survey.

Association question generator 701 may determine at step 703 whether to generate new questions. This may be based on a threshold number of questions currently in database 707. Other factors in making the determination may include how many times each question in database 707 was used, and in particular with the current participant.

If the system determines at 703 to generate new questions, the module may create new association questions at 705. The new questions may be added to database 707. At step 709, the system may access a predetermined number (e.g., two, three, four, or any other suitable number) of association questions. The system may present the questions to a participant at 711.

Figure 8:
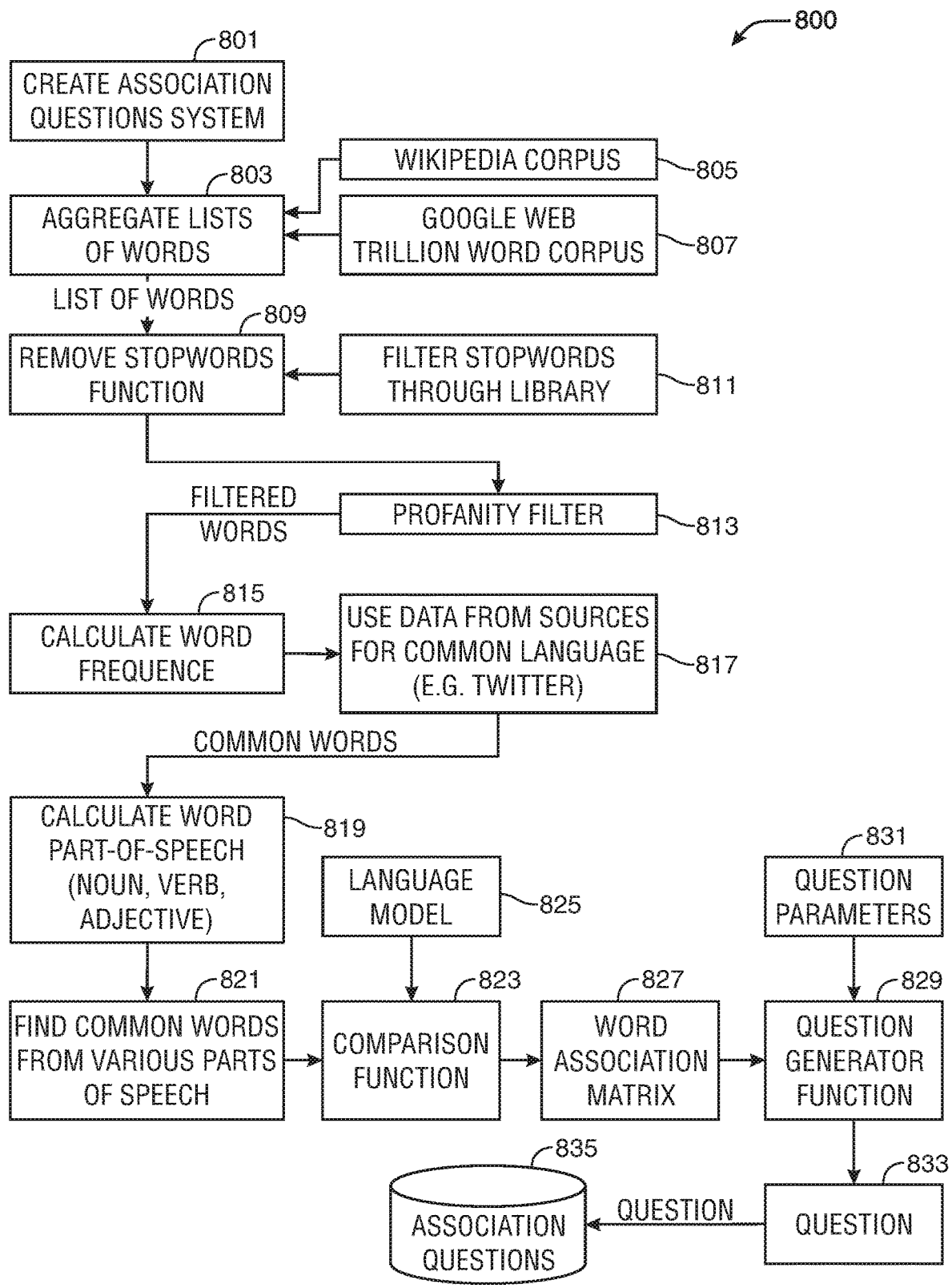
FIG. 8 shows yet another illustrative workflow in accordance with principles of the disclosure.

FIG. 8 shows illustrative workflow 800 according to aspects of the disclosure. Workflow 800 shows an exemplary diagram of an association question module that may be part of a system for maintaining diversity and/or validity (e.g., increasing data quality) in a task such as an online survey.

At step 801, an association question system may be created. At 803, the system may aggregate and/or access a set of words. The aggregation may be based at least in part on Wikipedia corpus 805, Google Web Trillion Word corpus 807, or any other suitable word corpus source. The system may apply a remove stop words function 809 to the set of words. The system may filter stop words through a suitable library 811. A profanity filter may be applied to the set of words at 813.

At 815, the system may calculate a word frequency for the filtered set of words. The system may use data from common language sources such as Twitter at 817. The system may calculate word part-of-speech (i.e., noun, verb, adjective, etc.) for the words in the set. At 821, the system may find common words from various parts of speech. At 823 the system may apply a comparison function (e.g., using language model 825). Language model 825 may include a machine-learning (ML) language model trained to generate vector positions for words, and to calculate association scores for sets of words based on the vector values. At 827 the system may generate a word association matrix. Using question parameters 831, the system may apply a question generator function at 829 to produce one or more questions 833. Questions 833 may, in some embodiments, be stored in database 835.

FIG. 9 shows illustrative screenshot 900 according to aspects of the disclosure. Screenshot 900 may represent an exemplary screener generated by an association question module that may be part of a system for maintaining diversity and/or validity in an online survey.

The screener may include one or more questions, such as exemplary questions 901 and 913. Screenshot 900 may show questions 901 and 913 displayed on a computing device associated with a participant.

Question 901 may ask the participant to select which word from among comparison words 905-911 is most associated with base word 903. The correct answer to question 901 may be comparison word 909. In the exemplary scenario shown in screenshot 900, the participant may have selected the correct answer.

Question 913 may ask the participant to select which word from among comparison words 917-923 is most associated with base word 915. The correct answer to question 913 may be comparison word 917. In the exemplary scenario shown in screenshot 900, the participant may have selected the correct answer.

Figure 10:
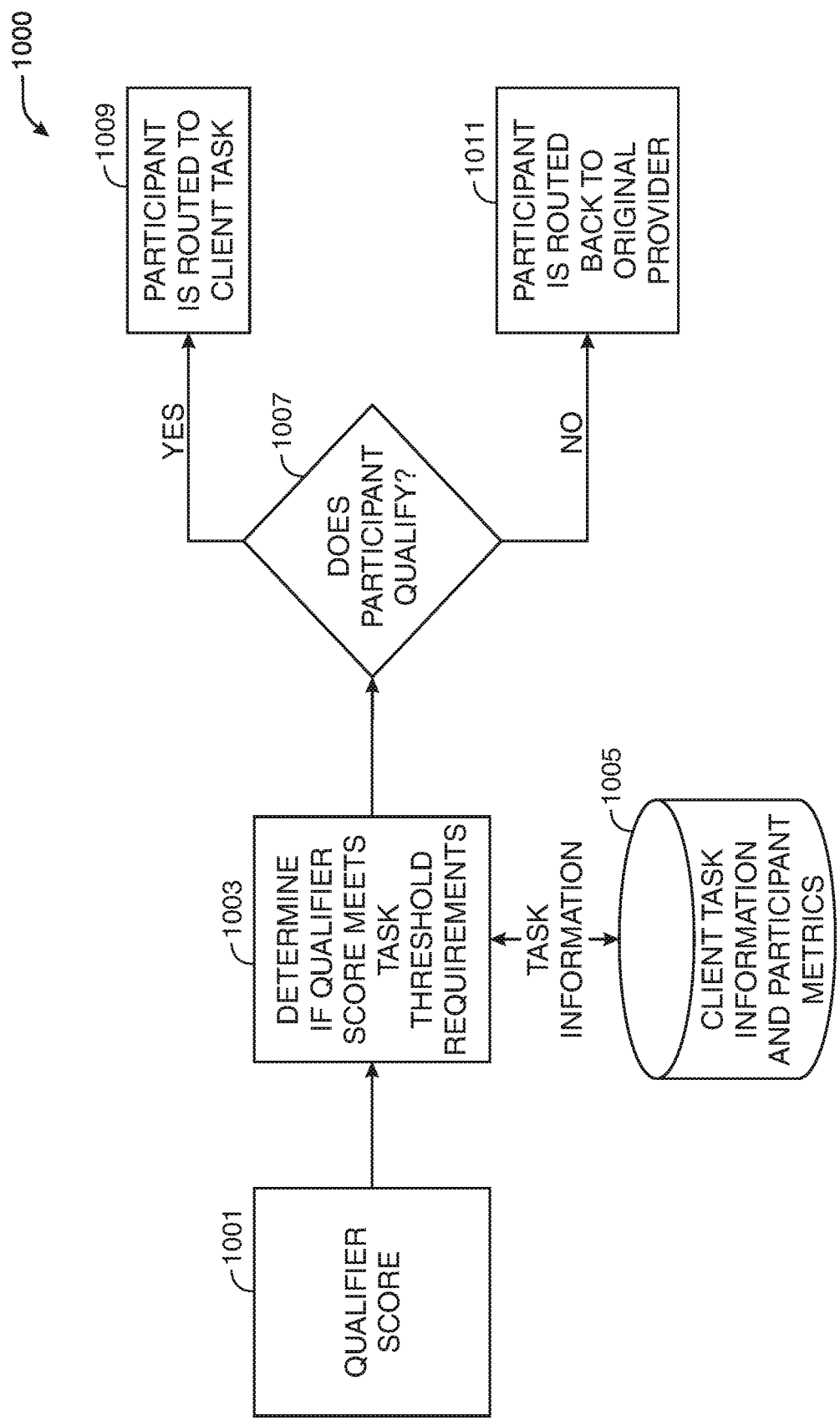
FIG. 10 shows an illustrative workflow in accordance with principles of the disclosure.

FIG. 10 shows illustrative workflow 1000 according to aspects of the disclosure. Workflow 1000 may represent an exemplary diagram of a part of a system for maintaining diversity and/or validity in an online survey.

The system may determine a qualifier score at 1001. The qualifier score may be based on computations of one or more computational modules. At 1003, the system may determine if the qualifier score meets threshold requirements for the survey. The threshold requirements may be predetermined standard requirements. In some embodiments, the threshold requirements may be determined for the survey based on survey information and/or other suitable metrics derived at 1005. The survey information may be stored in a database. The survey information may be derived by the system from the survey itself. Derivation of the information may include an NLP or other informational analysis that may include AI or ML. The derivation of the survey information and/or the determination of the threshold requirements may be executed in real-time for one or more surveys.

If the qualifier score meets the threshold requirements at 1007, the participant may be routed to the survey at 1009. If the qualifier score does not meet the threshold requirements at 1007, the participant may be routed away from the survey at 1011. At 1011 the participant may be routed back to the original market research platform.

In contrast to the processes described herein, in conventional workflows, millions of participants who are recruited across hundreds of market research platforms may be routed to surveys prior to being vetted. As a result of the lack of pre-survey vetting, over 30% of the dataset may typically be contaminated with inaccurate responses from participants who may be inattentive, may not understand the language of the survey, may not responding be effortfully, and/or may be responding somewhat randomly. Even when conventional screens are used, data quality is still poor and diversity suffers.

Figure 11:
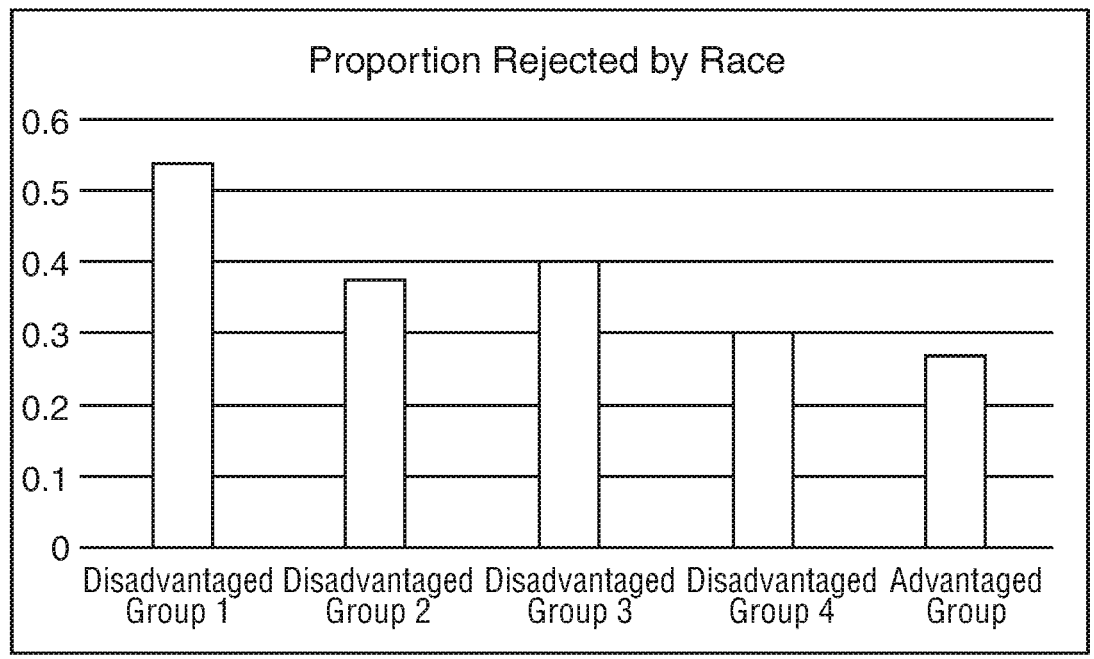
FIG. 11 shows an illustrative graph that includes data regarding conventional screening methods.
Figure 12:
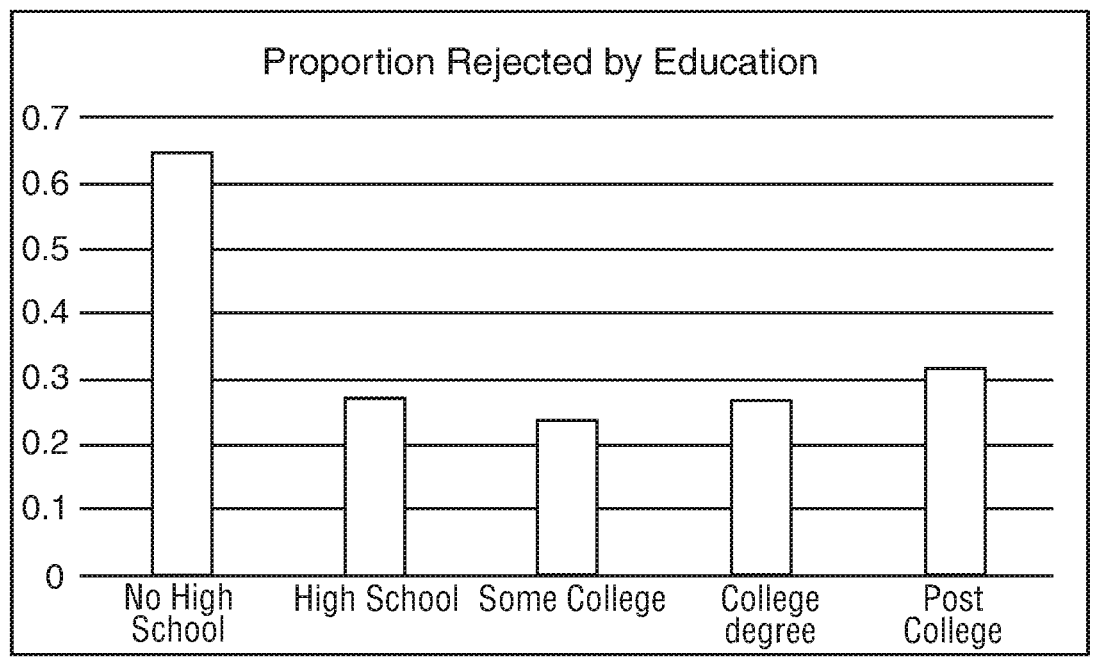
FIG. 12 shows another illustrative graph that includes data regarding conventional screening methods.

FIGS. 11 and 12 are bar graphs that show data-driven evidence of equality problems associated with standard screens. FIGS. 11 and 12 are based on data from over 20 million online surveys completed on an online research platform. FIG. 11 shows that certain racial, ethnic, and/or socioeconomic groups, shown as Disadvantaged Groups 1-4, are most likely to be routed out of surveys. FIG. 12 shows that participants without a high school education are almost three times as likely to be routed out of surveys.

Critically, for the data depicted in FIGS. 11 and 12, researchers had no way of knowing the demographics, including race and education, of participants. Thus, these results are not due to overt discrimination. Rather, the bias against certain minorities and other demographic groups arises on online platforms for the same reasons that give rise to the DVD problem in traditional offline marketplaces.

In contrast to conventional screens, screens according to aspects of the disclosure have been shown to maintain high levels of diversity. This has been validated with research studies in which the pass rates of conventional attention checks were compared to the pass rates of disclosed screening platforms. Table F (below) shows the results of a study with participants who were recruited from market research platforms.

Two groups of participants were recruited in the study shown in Table F. Group one (labeled as the 'Disadvantaged' group) was recruited based on criteria known to be correlated with a low pass rate of cognitively demanding stimuli in the DVD literature. The criteria included being from certain disadvantaged racial groups, and having low education levels (no college degree). The second group (labeled as the 'Advantaged' group) was recruited based on criteria known to be correlated with a high pass rate of cognitively demanding stimuli in the DVD literature. These criteria included being from a non-minority group, and having high education levels (at least a college degree). Results of the study are shown in Table F below.

TABLE F

Pass rates of conventional screens and disclosed screens

| | Pass | | |
| --- | --- | --- | --- |
| | Disadvantaged | Advantaged | Inter-group difference |
| Conventional screen | 51% | 69% | 18% |
| Disclosed screen | 79% | 83% | 4% |

Results of Table F, taken together with results reported above in Table A, show that the disclosed screen achieves high data quality among participants who pass, while reducing bias against disadvantaged participants, such as minorities and those with a lower level of education.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for digital screening platforms with precision threshold adjustment are provided. Persons skilled in the art will appreciate that the present invention can be practiced by other than the described embodiments, which are presented for purposes of illustration rather than of limitation.

What is claimed is:

1. A machine learning (ML)-based platform for precision filtering a pool of candidates, said platform comprising computer executable code stored in non-transitory memory that, when run on a processor, is configured to:
generate, via an association testing module, an interactive screener web page wherein, in order to generate the screener web page, the association testing module is configured to:
compile and/or access a corpus of data, said corpus comprising a set of words;
create and/or access a word association model, said word association model being an ML engine that is trained to derive an association value for a given word;
feed one or more words from the corpus to the word association model to derive an association value for each of the one or more words; and
automatically generate one or more questions based at least in part on feeding the one or more words from the corpus to the word association model, wherein each of the one or more questions tests a question recipient on an association between a base word and a plurality of comparison words or between the plurality of comparison words, and wherein the screener web page comprises the one or more questions;
transmit the screener web page comprising the one or more questions to a computing device associated with a candidate selected from among the pool of candidates;
receive a set of responses from the candidate that were input to the screener web page; score the candidate at least in part based on the set of responses;
route the candidate to an interactive on-line survey when the score satisfies a predetermined threshold response score; and
route the candidate away from the interactive on-line survey when the score fails to satisfy the predetermined threshold response score;
wherein a difficulty level of the screener web page and/or the predetermined threshold response score is determined based on a target level of data quality, said target level of data quality that is associated with accurate completion of the interactive on-line survey.

2. The platform of claim 1, wherein the platform further comprises:
a module that tests for a suspicious location of the candidate;
a language proficiency module that tests a language proficiency level of the candidate, said language proficiency module comprising a synonym question, a behaviometric analysis, and/or natural language processing (NLP) analysis; and/or
an event analysis module that tests for suspicious activity of the candidate.

3. The platform of claim 1, wherein the association testing module is further configured to process the corpus and/or the set of word pairs, said processing comprising removing unwanted words, said unwanted words comprising profane words and stop words.

4. The platform of claim 1, wherein the set of words of the corpus is associated with a maximum threshold level of difficulty.

5. The platform of claim 1, wherein:
the generating the one or more questions comprises:
compiling a set of word pairs, each word pair comprising two words from the corpus;
feeding the set of word pairs to the word association model; and
deriving, via the word association model, an association score for each word pair in the set of word pairs, wherein the association score between two words comprises a level of association between the two words and is based at least in part on the association values of the two words; and
the association between the base word and/or the plurality of comparison words is based on the association scores.

6. The platform of claim 1, wherein the generating at least one of the one or more questions comprises:
selecting the base word from the corpus; and
selecting four comparison words, said four comparison words comprising:
one comparison word that has an association score with the base word that is within a first range of association scores, and three comparison words that each have an association score with the base word that is within a second range of association scores, wherein an association score between two words comprises a level of association between the two words and is based at least in part on the association values of the two words; or
two comparison words that each have an association score with the base word that is within the first range of association scores, and two comparison words that each have an association score with the base word that is within the second range of association scores.

7. The platform of claim 6, wherein:
the first range of association scores comprises scores that are between 0.65-0.75, 0.80-0.95,0.60-0.75, or 0.70-0.80; and
the second range of association scores comprises scores that are between 0.00-0.10, 0.10-0.30,0.25-0.40, or 0.10-0.20.

8. The platform of claim 1, wherein the generating at least one of the one or more questions comprises:
selecting four comparison words, said four comparison words comprising three comparison words that are each within a first range of association scores to each other, and a fourth comparison word that is within a second range of association scores to each of the three comparison words, wherein an association score between two words comprises a level of association between the two words and is based at least in part on the association values of the two words.

9. The platform of claim 1, wherein the target level of data quality is determined for every survey in a set of on-line surveys.

10. A machine learning (ML)-based digital filtering system for providing quality data for a survey while maintaining a level of participant diversity, said system comprising computer executable code stored in non- transitory memory and run on a processor, said system further comprising:
an interactive survey screener module that tests a data quality level; and
an anti-fraud module that tests for fraudulent activity;
wherein:
the screener module is configured to generate a pre-survey screen web page that is transmitted to a computing device associated with a participant;
the system is configured to receive a response input by the participant to the pre-survey screen web page; and
when the response fails to achieve a predetermined threshold response, the system is configured to reject and/or flag the participant from the survey; and
wherein a difficulty level of the pre-survey screen web page and/or the predetermined threshold response is determined based on a target level of data quality; and
wherein the pre-survey screen comprises an association screener web page that tests an association ability level of the participant, and the screener web page module is configured to:
compile and/or access a corpus of data, said corpus comprising a set of words and/or sentences;
create and/or access a word association model, said word association model being an ML engine that is trained to derive an association value for a given word;
feed one or more words from the corpus to the word association model to derive an association value for each of the one or more words; and
automatically generate one or more questions for the association screener web page module based at least in part on feeding the one or more words from the corpus to the word association model, wherein each of the one or more questions tests the participant on an association between a base word and a plurality of comparison words or between the plurality of comparison words.

11. The system of claim 10, wherein:
the generating the one or more questions comprises:
compiling a set of word pairs, each word pair comprising two words from the corpus;
feeding the set of word pairs to the word association model; and
deriving, via the word association model, an association score for each word pair in the set of word pairs, wherein the association score between two words comprises a level of association between the two words and is based at least in part on the association values of the two words;
the association between the base word and the plurality of comparison words or between the plurality of comparison words is based on the association scores; and
the generating each of the one or more questions comprises:
selecting the base word from the corpus, and selecting four comparison words, said four comparison words comprising:
one comparison word that has an association score with the base word that is within a first range of association scores, and three comparison words that each have an association score with the base word that is within a second range of association scores, wherein an association score between two words comprises a level of association between the two words and is based at least in part on the association values of the two words; or
two comparison words that each have an association score with the base word that is within the first range of association scores, and two comparison words that each have an association score with the base word that is within the second range of association scores; or
selecting four comparison words from the corpus, said four comparison words comprising three comparison words that are each within a first range of association scores to each other, and a fourth comparison word that is within a second range of association scores to each of the three comparison words.

12. The system of claim 10, wherein the pre-survey screen web page comprises a word frequency screener that tests a word recognition ability level of the participant, and wherein the screener module is configured to:
compile and/or access a corpus of data, said corpus comprising a set of words and/or sentences;
derive a frequency value for the words in the corpus; and
generate one or more questions for the word frequency screener based at least in part on the frequency values, wherein each of the one or more questions presents the participant with a plurality of comparison words and prompts the participant to select the most frequently used or the least frequently used of the comparison words.

13. The system of claim 10, wherein:
the pre-survey screen web page comprises a language proficiency screen that tests a language proficiency level of the participant, said language proficiency screen comprising a synonym question, a behaviometric analysis, and/or natural language processing (NLP) analysis; and/or
the anti-fraud module further comprises:
a location testing module that tests for a suspicious location of the participant; and/or
event analysis module that tests for suspicious activity of the participant.

14. The system of claim 10, wherein the target level of data quality is determined for every survey in a set of surveys.

15. The system of claim 10, wherein the screener web page module is further configured to preprocess the corpus, said preprocessing comprising removing unwanted words, said unwanted words comprising profane words and stop words.

16. A machine learning (ML)-based method for configuring a survey screen to provide a valid and diverse online survey, the method executed by computer code stored in non-transitory memory and run on a processor, the method comprising:
determining a target level of participant attentiveness associated with accurate completion of the survey;
automatically determining a participant screening threshold based on the target level of participant attentiveness;
automatically generating a survey screen web page based on the participant screening threshold, wherein the survey screen web page is generated based at least in part on an output from an ML engine;
transmitting the survey screen web page to a computing device associated with a participant;
receiving a response of the participant to the survey screen web page on the computing device; and
when the response fails to achieve a predetermined threshold response, rejecting the participant from the survey.

17. The method of claim 16, wherein the survey screen web page comprises an association screener web page, and generating the association screener web page comprises:
compiling and/or accessing a corpus of data, said corpus comprising a set of words that are associated with a maximum threshold level of difficulty;
creating and/or accessing a word association model that is trained to derive an association value for a given word;
creating a set of word pairs via applying the corpus to the word association model; and
generating one or more questions based on the set of word pairs, wherein the one or more questions test a question recipient on an association between a base word and a plurality of comparison words.

18. The method of claim 16, wherein the survey screen web page includes a plurality of modules, each module testing an aspect of data quality, and the modules include:
a location module for testing to determine the existence of a suspicious location associated with the participant;
an association screener web page module testing an association skill level of the participant;
a language proficiency module testing a language proficiency level of the participant; and/or
an event analysis module testing for suspicious activity of the participant.

19. The method of claim 16, further comprising determining the target level of participant attentiveness for every survey in a set of surveys.

20. The method of claim 16, further comprising:
determining a level of diversity across a plurality of participants in the survey; and
when the level of diversity is below a predetermined threshold level, adjusting the survey screen web page to raise the level of diversity.

21. The method of claim 16, further comprising:
determining a level of accuracy across a plurality of participants in the survey; and
when the level of accuracy is below a predetermined threshold level, adjusting the survey screen web page to raise the level of accuracy.

22. The method of claim 16, further comprising:
determining a level of diversity across a plurality of participants in the survey;
determining a level of accuracy across the plurality of participants in the survey; and
balancing the levels of diversity and accuracy by:
when the level of diversity is below a predetermined threshold diversity level and the level of accuracy is above a predetermined threshold accuracy level, adjusting the survey screen web page to raise the level of diversity to be above the predetermined threshold diversity level while maintaining the level of accuracy to be above the predetermined threshold accuracy level; and
when the level of accuracy is below a predetermined threshold accuracy level and the level of diversity is above a predetermined threshold diversity level, adjusting the survey screen web page to raise the level of accuracy to be above the predetermined threshold accuracy level while maintaining the level of diversity to be above the predetermined threshold diversity level.

23. The method of claim 16, further comprising performing natural language processing (NLP) analysis on one or more questions of the survey, and wherein the determining the target level of participant attentiveness is based at least in part on the NLP analysis.

24. The method of claim 16, further comprising performing natural language processing (NLP) analysis and/or behaviometric analysis on one or more responses of the participant to the survey, and adjusting the survey screen web page based at least in part on the NLP analysis and/or the behaviometric analysis.

25. The method of claim 16, wherein the method further comprises using a two-tiered screening web page, said using two-tiered screening web page comprising executing a preliminary screen web page, and executing a secondary screen web page in response to the participant failing the preliminary screen web page.

26. The method of claim 16, wherein the survey is a first survey and the method is extendable to receive any number of additional surveys, the method further comprising:
updating a database with survey screen web page information of the first survey;
mapping the survey screen web page information of the first survey to the target level of participant attentiveness of the first survey; and
for each additional survey:
determining a target level of participant attentiveness associated with accurate completion of said additional survey;
when the target level of participant attentiveness of said additional survey is mapped to survey screen web page information in the database, adjusting a survey screen web page of said additional survey based on the mapped survey screen web page in the database; and
when the target level of participant attentiveness of said additional survey is not mapped to survey screen web page information in the database:
determining a participant screening threshold of said additional survey based on the target level of participant attentiveness of said additional survey;
adjusting a survey screen web page of said additional survey based on the participant screening threshold of said additional survey; and updating the database with survey screen web page information of said additional survey and mapping the survey screen web page information of said additional survey to the target level of participant attentiveness of said additional survey.

* * * * *